(12) United States Patent
Kato et al.

(10) Patent No.: US 10,804,701 B2
(45) Date of Patent: Oct. 13, 2020

(54) APPARATUS AND METHOD FOR STABILIZING POWER SYSTEM

(71) Applicant: Hitachi, Ltd., Chiyoda-ku, Tokyo (JP)

(72) Inventors: Daichi Kato, Tokyo (JP); Nao Saito, Tokyo (JP); Masahiro Yatsu, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 16/315,363

(22) PCT Filed: Jul. 28, 2017

(86) PCT No.: PCT/JP2017/027363
§ 371 (c)(1),
(2) Date: Jan. 4, 2019

(87) PCT Pub. No.: WO2018/061450
PCT Pub. Date: Apr. 5, 2018

(65) Prior Publication Data
US 2019/0260205 A1 Aug. 22, 2019

(30) Foreign Application Priority Data
Sep. 28, 2016 (JP) .................. 2016-188989

(51) Int. Cl.
*H02J 3/24* (2006.01)
*H02J 13/00* (2006.01)
(Continued)

(52) U.S. Cl.
CPC .................. *H02J 3/24* (2013.01); *G05F 1/66* (2013.01); *H02J 3/00* (2013.01); *H02J 13/00* (2013.01)

(58) Field of Classification Search
None
See application file for complete search history.

(56) References Cited

U.S. PATENT DOCUMENTS 6,906,434 B1 6/2005 Koeppe et al.
2013/0265030 A1* 10/2013 Kuroda .................. G06Q 50/06
323/318
(Continued)

FOREIGN PATENT DOCUMENTS

JP 5-130737 A 5/1993
JP 2007-288878 A 11/2007
(Continued)

OTHER PUBLICATIONS

International Search Report (PCT/ISA/210) issued in PCT Application No. PCT/JP2017/027363 dated Sep. 12, 2017 with English translation (three (3) pages).
(Continued)

*Primary Examiner* — Jared Fureman
*Assistant Examiner* — Aqeel H Bukhari
(74) *Attorney, Agent, or Firm* — Crowell & Moring LLP

(57) ABSTRACT

With conventional technology, since calculation of system stability is performed regarding all imaginable failure cases for the combinations of all objects to be controlled to determine an object to be controlled, there has been a problem of not being able to determine an object to be controlled in all the imaginable failure cases within a calculation period due to longer calculation time. In order to solve the problem, this apparatus for stabilizing a power system is provided with: an imaginable failure scenario generation unit; a power-flow state generation unit that generates a power-flow state of the power system; a system stability calculation unit that calculates system stability of the power system; a to-be-controlled candidate calculation unit that calculates a candidate object to be controlled for stabilization of the power system; a control table calculation unit that calculates a control table; a system stability calculation requiring/non-requiring state range extraction unit
(Continued)

that extracts a state range where stability calculation of the power system is required and a state range where stability calculation is not required; and a system stability calculation requiring/non-requiring determination unit that determines whether or not stability calculation of the power system is required.

12 Claims, 23 Drawing Sheets

(51) Int. Cl.
*G05F 1/66* (2006.01)
*H02J 3/00* (2006.01)

(56) References Cited

U.S. PATENT DOCUMENTS

| | | | | |
|---|---|---|---|---|
| 2015/0194966 A1* | 7/2015 | Kimura | ................... | H02J 3/381 |
| | | | | 700/287 |
| 2015/0214741 A1* | 7/2015 | Kuroda | ..................... | H02J 3/30 |
| | | | | 700/298 |
| 2017/0353033 A1* | 12/2017 | Kuroda | ................ | G05B 19/042 |

FOREIGN PATENT DOCUMENTS

| JP | 2011-166888 A | 8/2011 |
|---|---|---|
| JP | 2011-250638 A | 12/2011 |

OTHER PUBLICATIONS

Japanese-language Written Opinion (PCT/ISA/237) issued in PCT Application No. PCT/JP2017/027363 dated Sep. 12, 2017 (three (3) pages).
Extended European Search Report issued in European Application No. 17855408.5 dated Apr. 6, 2020 (10 pages).

\* cited by examiner

[FIG. 1]
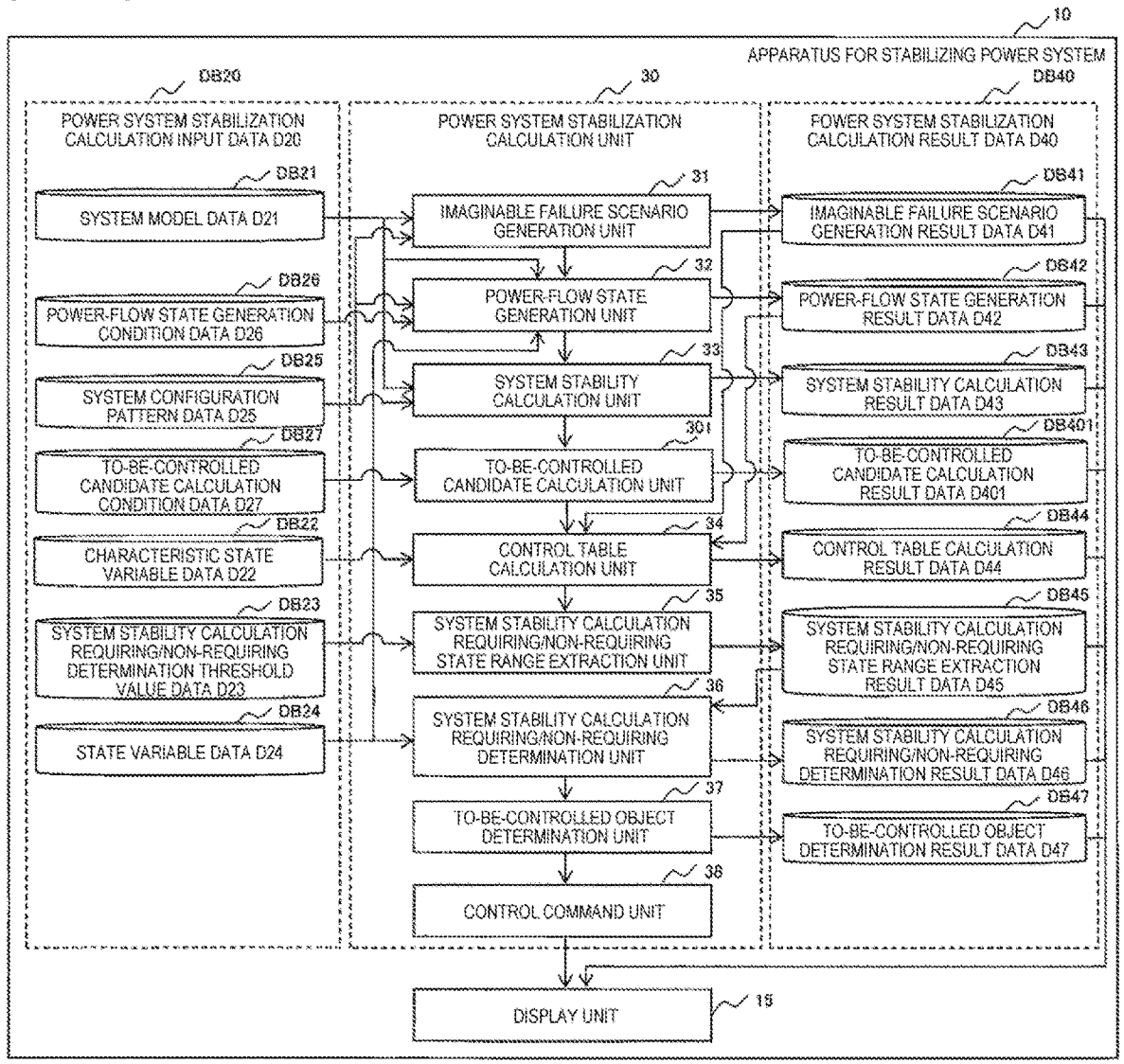

[FIG. 2]
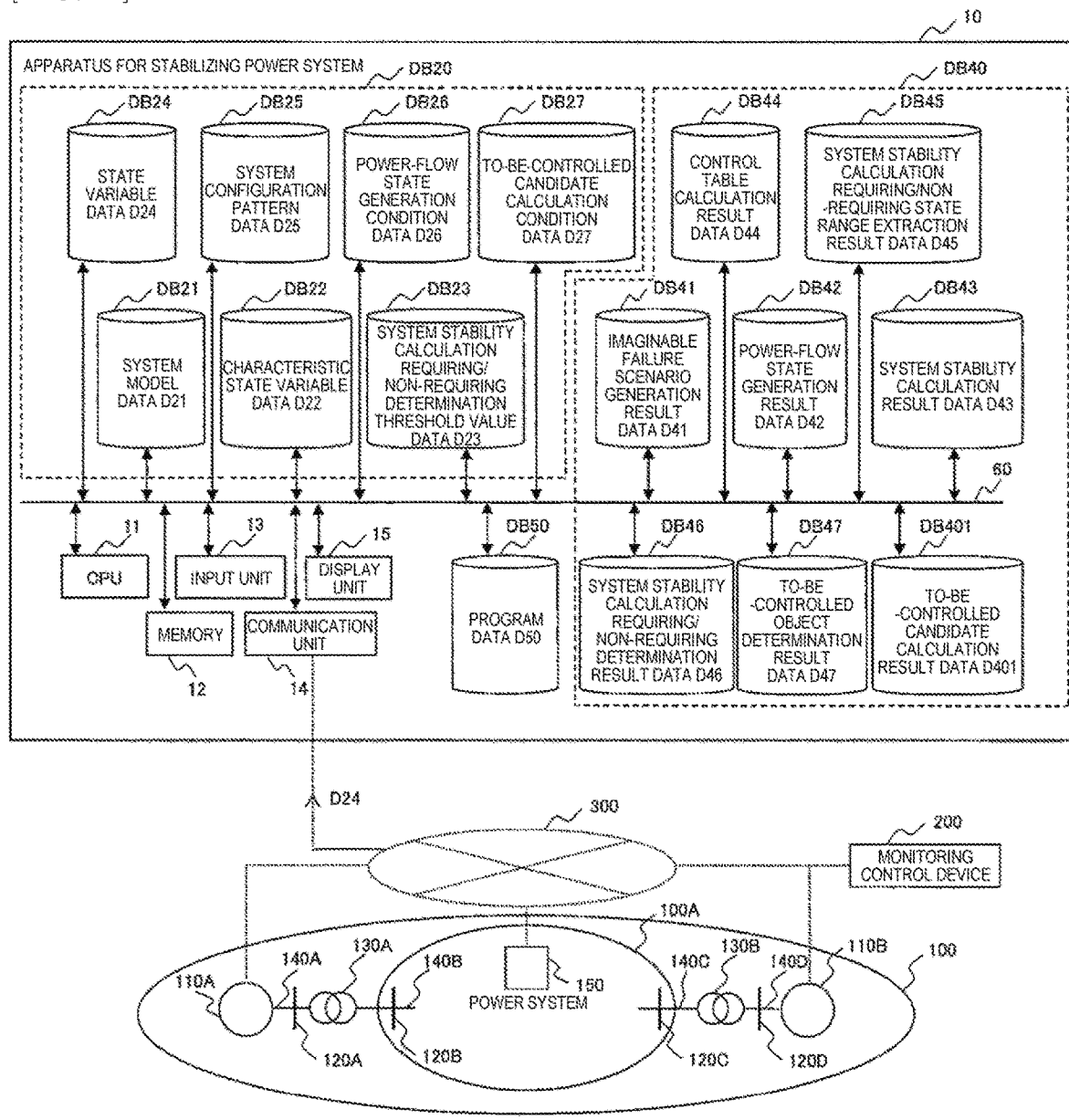

[FIG. 3]
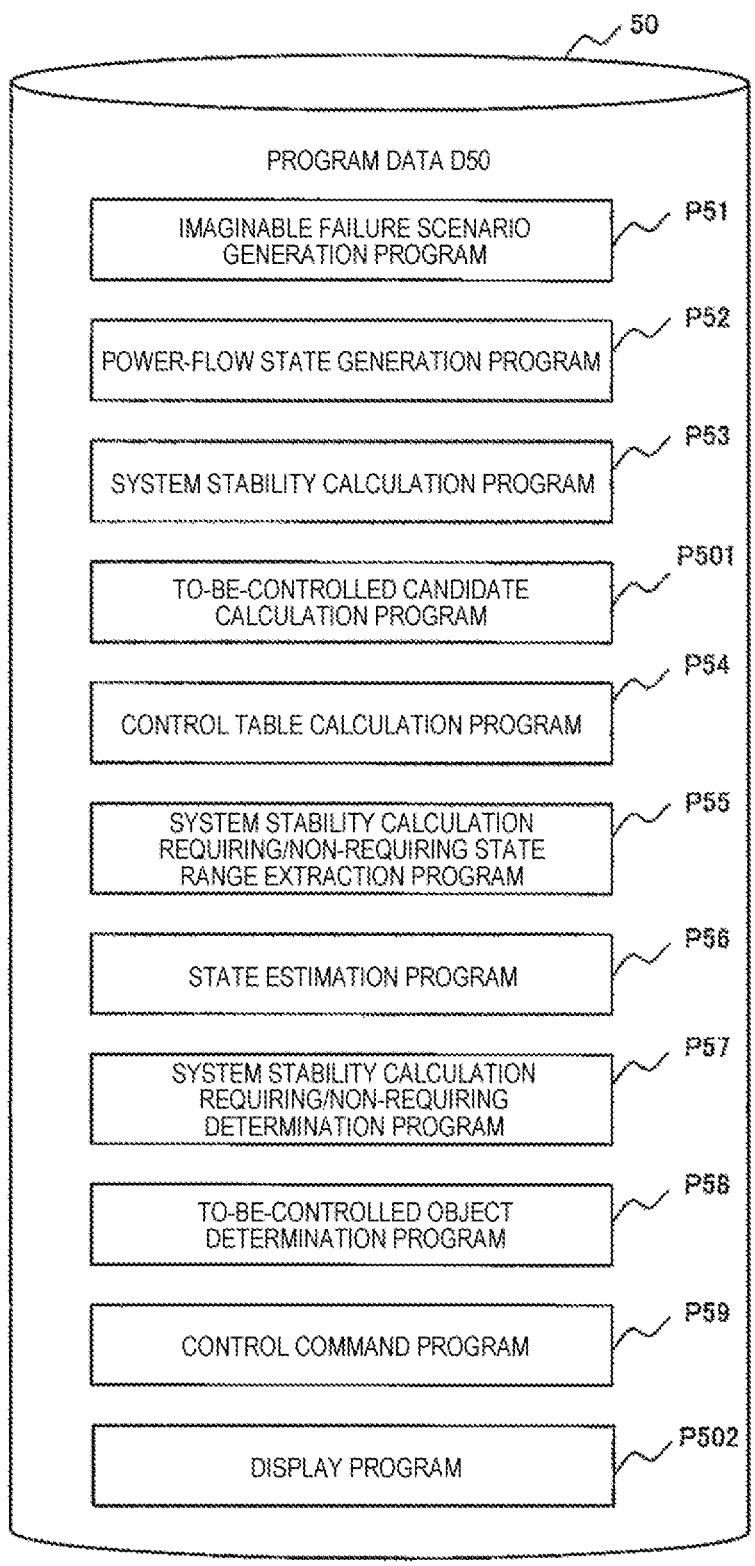

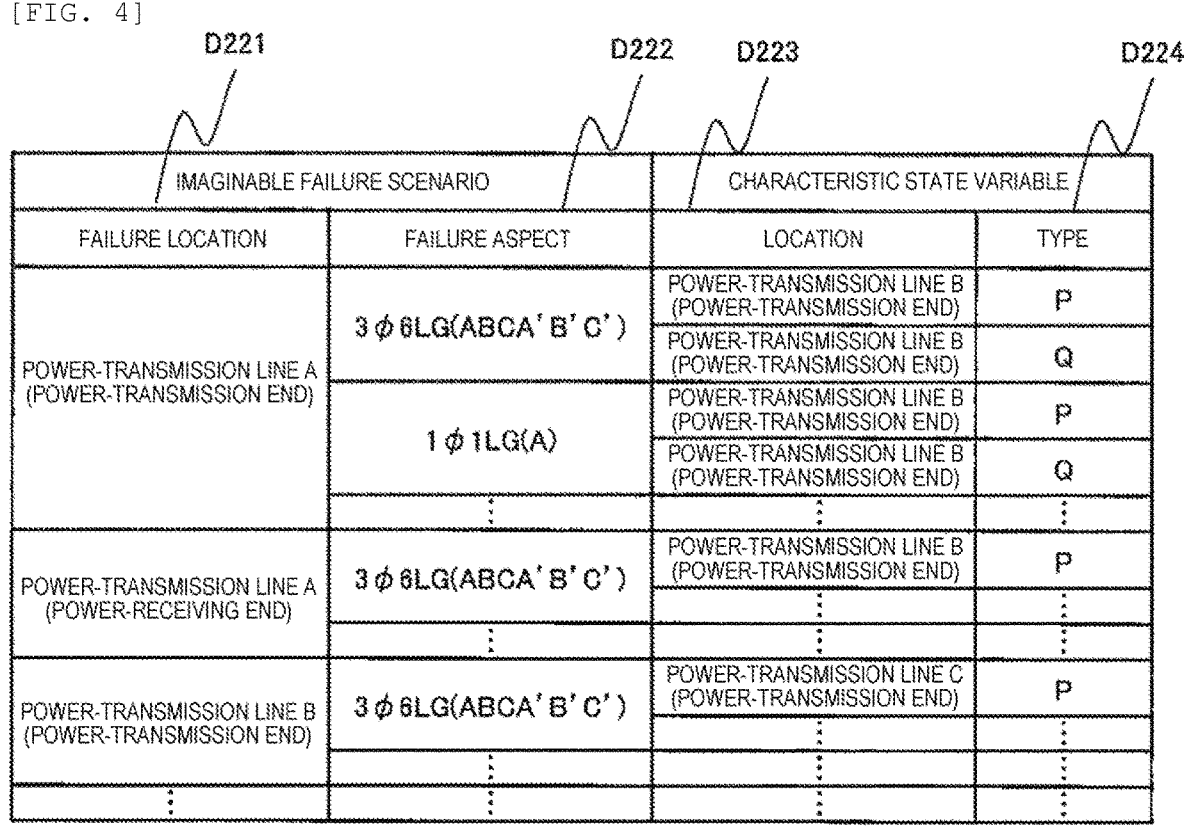
[FIG. 4]

[FIG. 5]
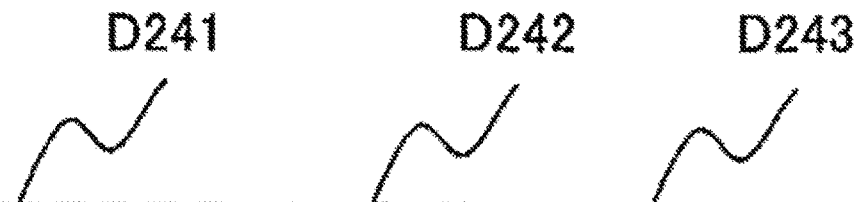

[FIG. 6]
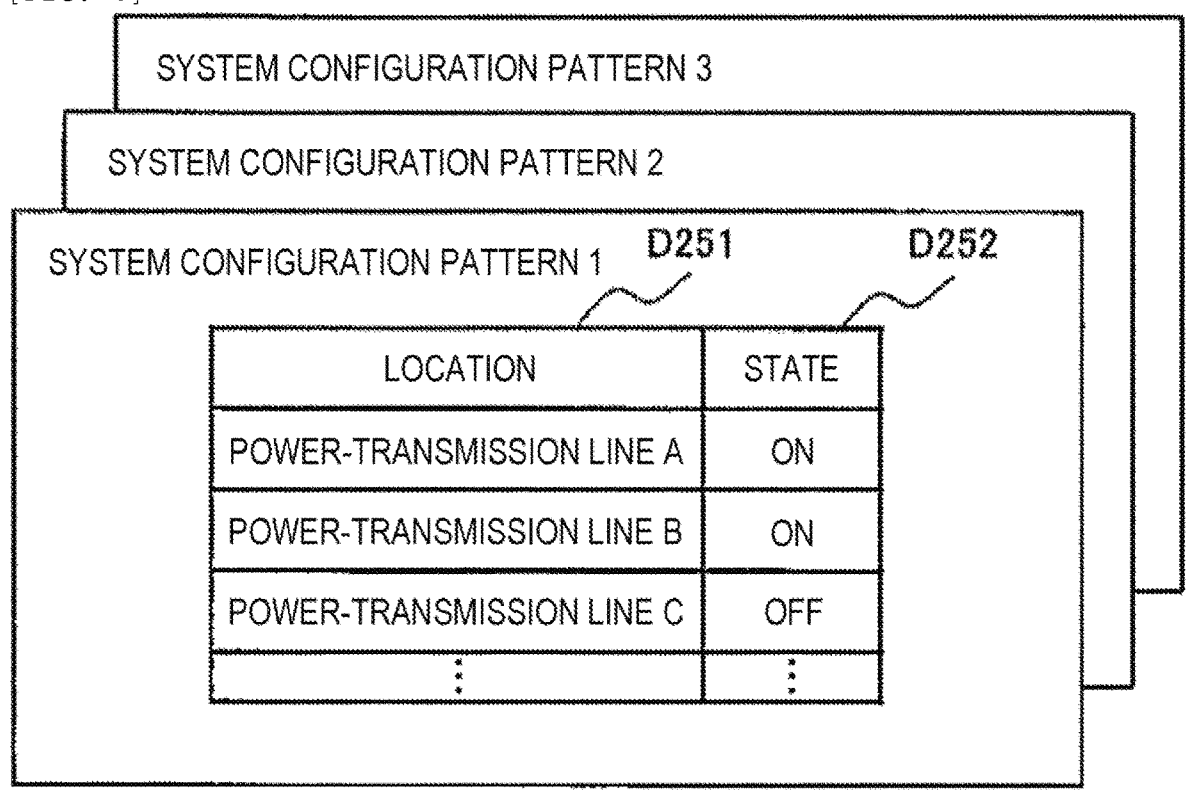

[FIG. 7]

[FIG. 8]

POWER-FLOW STATE 3

POWER-FLOW STATE 2

POWER-FLOW STATE 1    D421    D422    D423

| TARGET | TYPE | VALUE (p.u.) |
|---|---|---|
| GENERATOR G1 | P | 1.0 |
|  | V | 1.0 |
| GENERATOR G2 | P | 1.0 |
|  | V | 1.0 |
| GENERATOR G3 | P | 1.0 |
|  | V | 1.0 |
| ⋮ | ⋮ | ⋮ |
| LOAD L1 | P | 0.5 |
|  | Q | 0.5 |
| LOAD L2 | P | 0.5 |
|  | Q | 0.5 |
| ⋮ | ⋮ | ⋮ |

[FIG. 9]

| FAILURE LOCATION: POWER-TRANSMISSION LINE A (POWER-TRANSMISSION END) | | | | | |
|---|---|---|---|---|---|
| FAILURE ASPECT: 1ØLG(A) | | CHARACTERISTIC STATE VARIABLE | | | |

| FAILURE LOCATION: POWER-TRANSMISSION LINE A (POWER-TRANSMISSION END) | | | | | |
|---|---|---|---|---|---|
| FAILURE ASPECT: 3ØLG(ABCA'B'C') D441 | D442 | | D443 | | D444 |
| | CHARACTERISTIC STATE VARIABLE | | | | CANDIDATE OBJECT TO BE CONTROLLED |
| | VARIABLE 1 (X1) | | VARIABLE 2 (X2) | | |
| | LOCATION | TYPE | LOCATION | TYPE | |
| | POWER-TRANSMISSION LINE B (POWER-TRANSMISSION END) | P | POWER-TRANSMISSION LINE B (POWER-TRANSMISSION END) | Q | |
| | 0.5 | | 0.5 | | NONE |
| | | | 0.6 | | NONE |
| | | | 0.7 | | NONE |
| | | | 0.8 | | GENERATOR G1 |
| | | | 0.9 | | NONE |
| | | | 1.0 | | GENERATOR G1 |
| | | | 1.1 | | GENERATOR G1 |
| | | | 1.2 | | GENERATOR G1 |
| | 0.6 | | 0.5 | | NONE |
| | | | 0.6 | | NONE |
| | | | 0.7 | | NONE |
| | | | 0.8 | | GENERATOR G1 |
| | | | 0.9 | | NONE |
| | | | 1.0 | | GENERATOR G1 |
| | | | 1.1 | | GENERATOR G1 |
| | | | 1.2 | | GENERATOR G1 |
| | 0.7 | | 0.5 | | NONE |
| | | | 0.6 | | NONE |
| | | | 0.7 | | NONE |
| | | | 0.8 | | GENERATOR G1 |
| | | | 0.9 | | NONE |
| | | | 1.0 | | GENERATOR G1 |
| | | | 1.1 | | GENERATOR G1 |
| | | | 1.2 | | GENERATOR G1 |

[FIG. 10]

| FAILURE LOCATION: POWER-TRANSMISSION LINE A (POWER-TRANSMISSION END) | | | | | | |
|---|---|---|---|---|---|---|
| FAILURE ASPECT: 3Ø6LG(ABCA'B'C') D451 | D452 CHARACTERISTIC STATE VARIABLE RANGE | | | | D453 D454 CANDIDATE OBJECT TO BE CONTROLLED | D455 REQUIRED /NON-REQUIRED |
| | VARIABLE 1 (X1) | | VARIABLE 2 (X2) | | | |
| | LOCATION | TYPE | LOCATION | TYPE | | |
| | POWER-TRANSMISSION LINE B (POWER-TRANSMISSION END) | P | POWER-TRANSMISSION LINE B (POWER-TRANSMISSION END) | Q | | |
| | 0.5≦X1<0.7 | | 0.5≦X2<0.7 | | NONE | NON-REQUIRED |
| | | | 0.7≦X2≦1.0 | | — | REQUIRED |
| | | | 1.0<X2≦1.2 | | GENERATOR G1 | NON-REQUIRED |
| | 0.7≦X1≦1.0 | | 0.5≦X2<0.7 | | — | REQUIRED |
| | | | 0.7≦X2≦1.0 | | — | REQUIRED |
| | | | 1.0<X2≦1.2 | | GENERATOR G1 | NON-REQUIRED |
| | 1.0<X1≦1.2 | | 0.5≦X2<0.7 | | GENERATOR G1 | NON-REQUIRED |
| | | | 0.7≦X2≦1.0 | | GENERATOR G1 | NON-REQUIRED |
| | | | 1.0<X2≦1.2 | | GENERATOR G2 | NON-REQUIRED |

FAILURE LOCATION: POWER-TRANSMISSION LINE A (POWER-TRANSMISSION END)
FAILURE ASPECT: 1Ø1LG(A)

[FIG. 11]
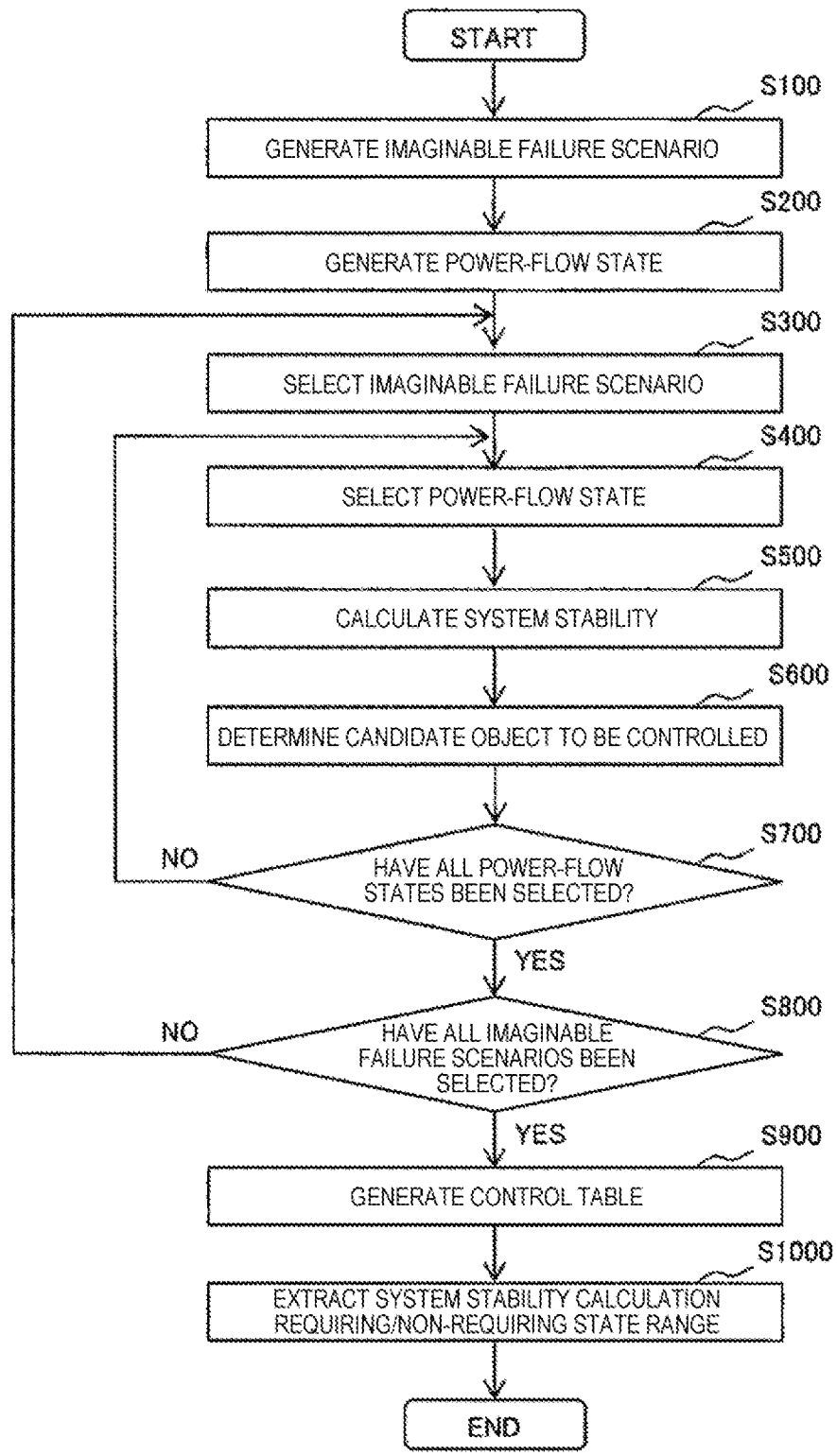

[FIG. 12]
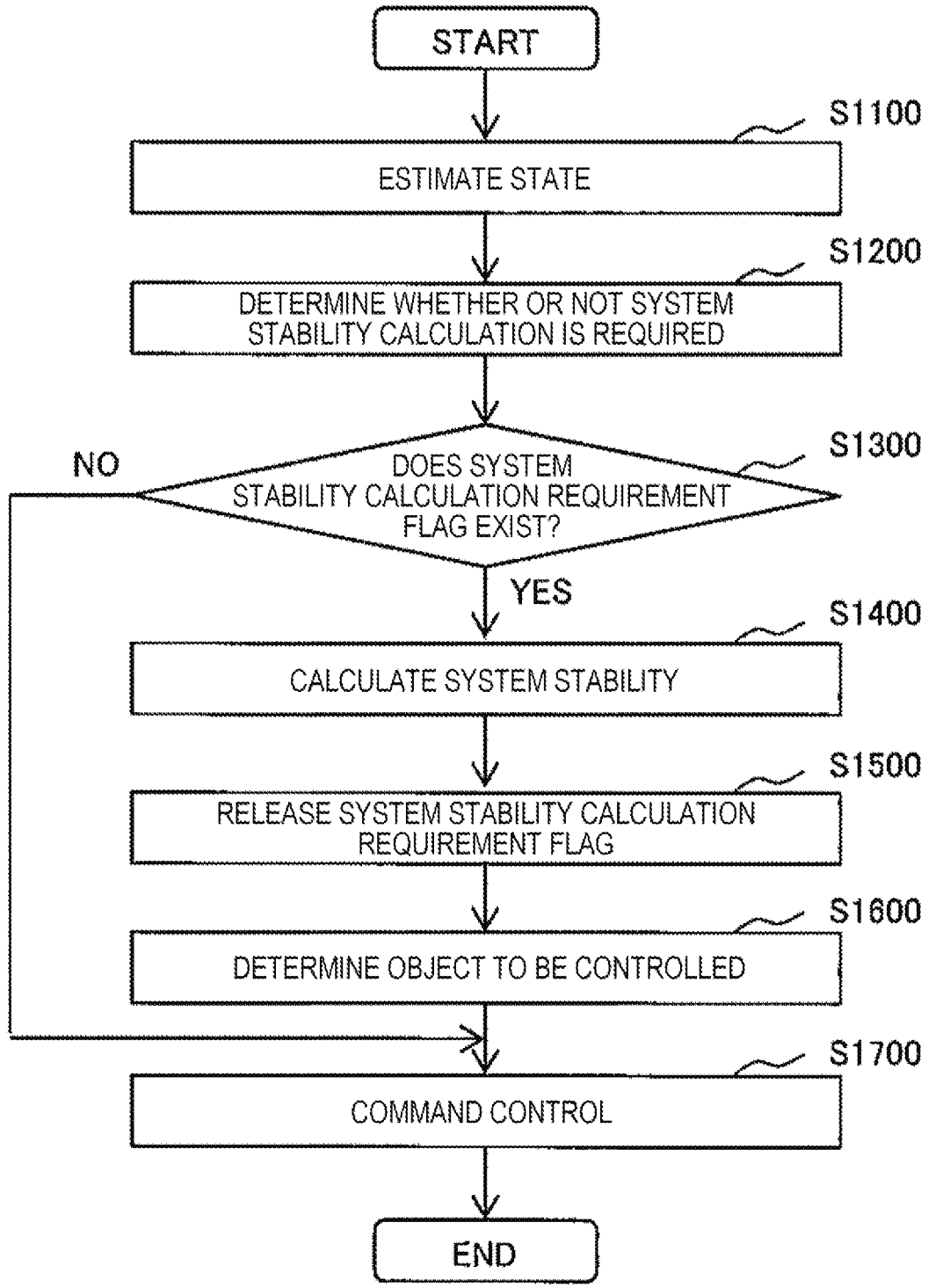

[FIG. 13]
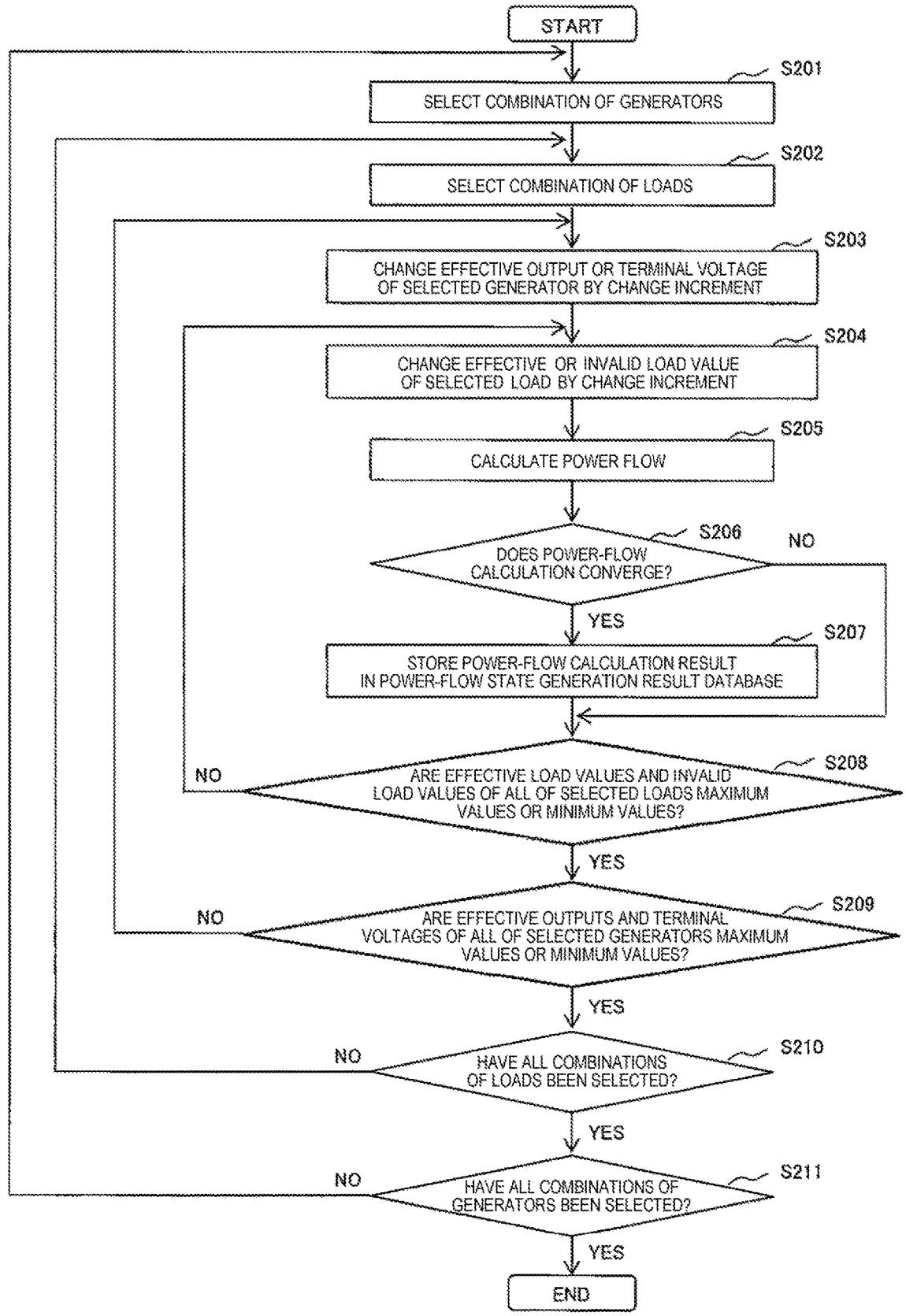

[FIG. 14]
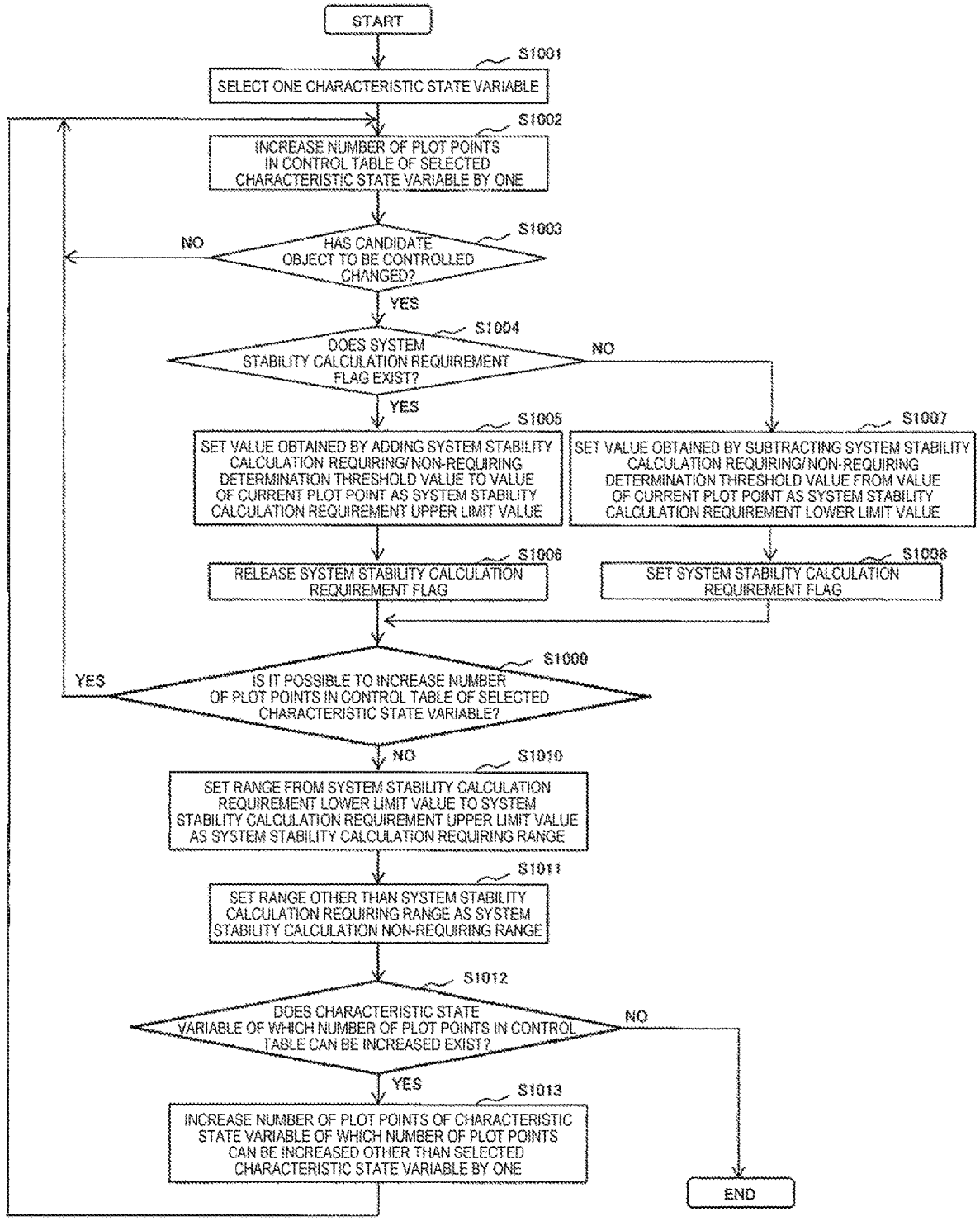

[FIG. 15]
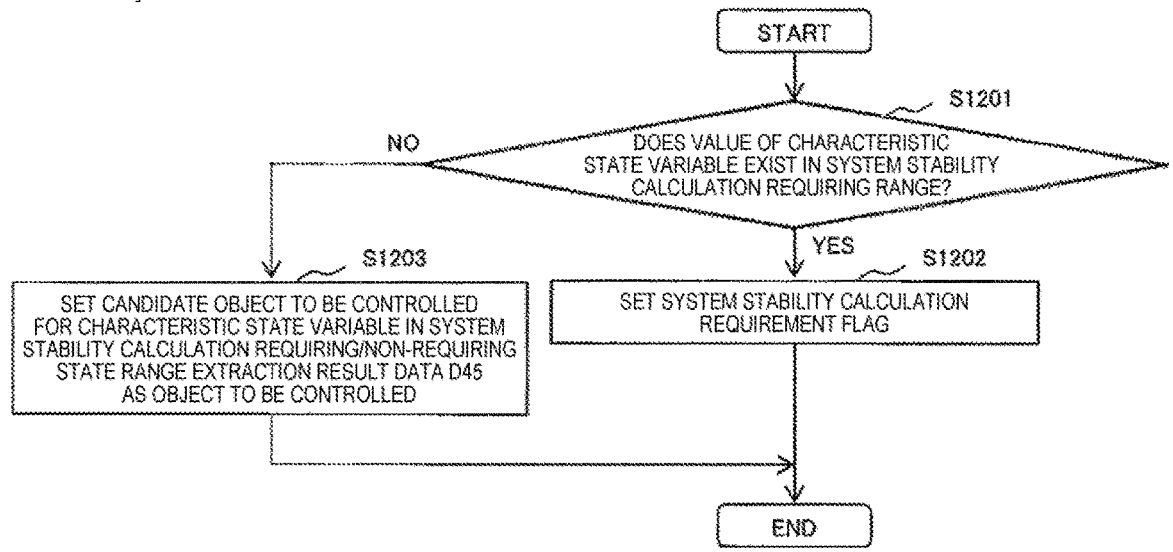

[FIG. 16]
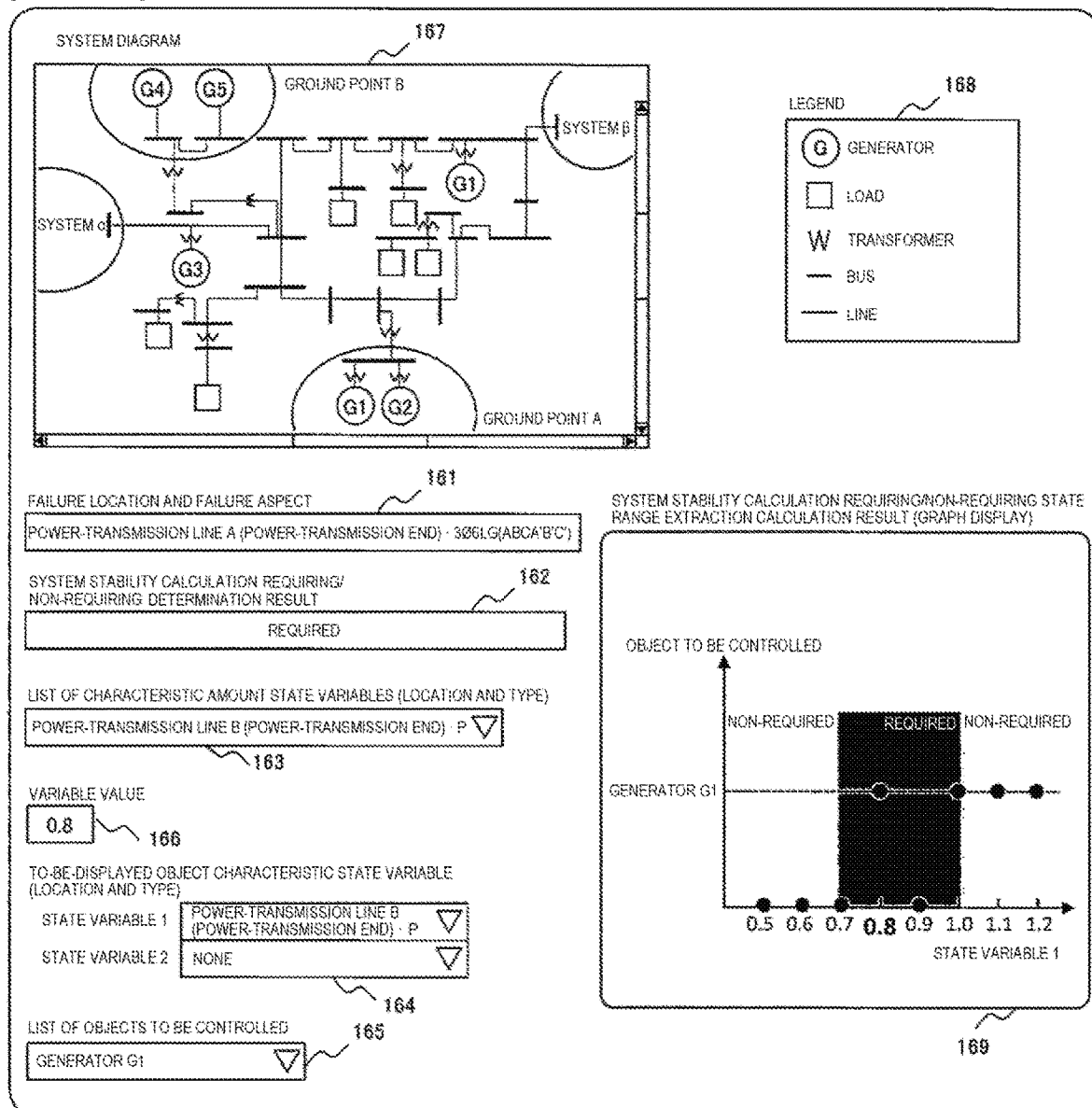

[FIG. 17]
| TARGET | TYPE | MAXIMUM VALUE (p.u.) | MINIMUM VALUE (p.u.) | CHANGE INCREMENT (p.u.) |
|---|---|---|---|---|
| GENERATOR G1 | P | 2.0 | 0.8 | 0.1 |
| | V | 1.1 | 0.9 | 0.1 |
| GENERATOR G2 | P | 1.8 | 0.8 | 0.1 |
| | V | 1.1 | 0.9 | 0.1 |
| ⋮ | ⋮ | ⋮ | ⋮ | ⋮ |
| LOAD L1 | P | 1.4 | 0.8 | 0.1 |
| | Q | 0.4 | 0.2 | 0.1 |
| LOAD L2 | P | 1.5 | 0.9 | 0.1 |
| | Q | 0.6 | 0.3 | 0.1 |
| ⋮ | ⋮ | ⋮ | ⋮ | ⋮ |
D261  D262  D263  D264  D265

[FIG. 18]
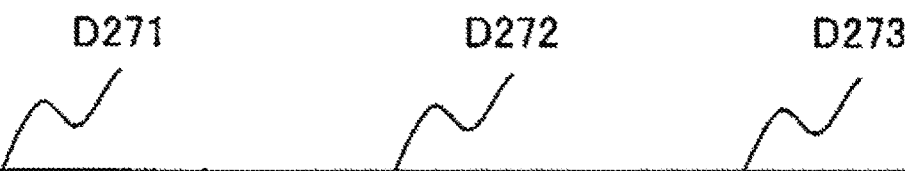

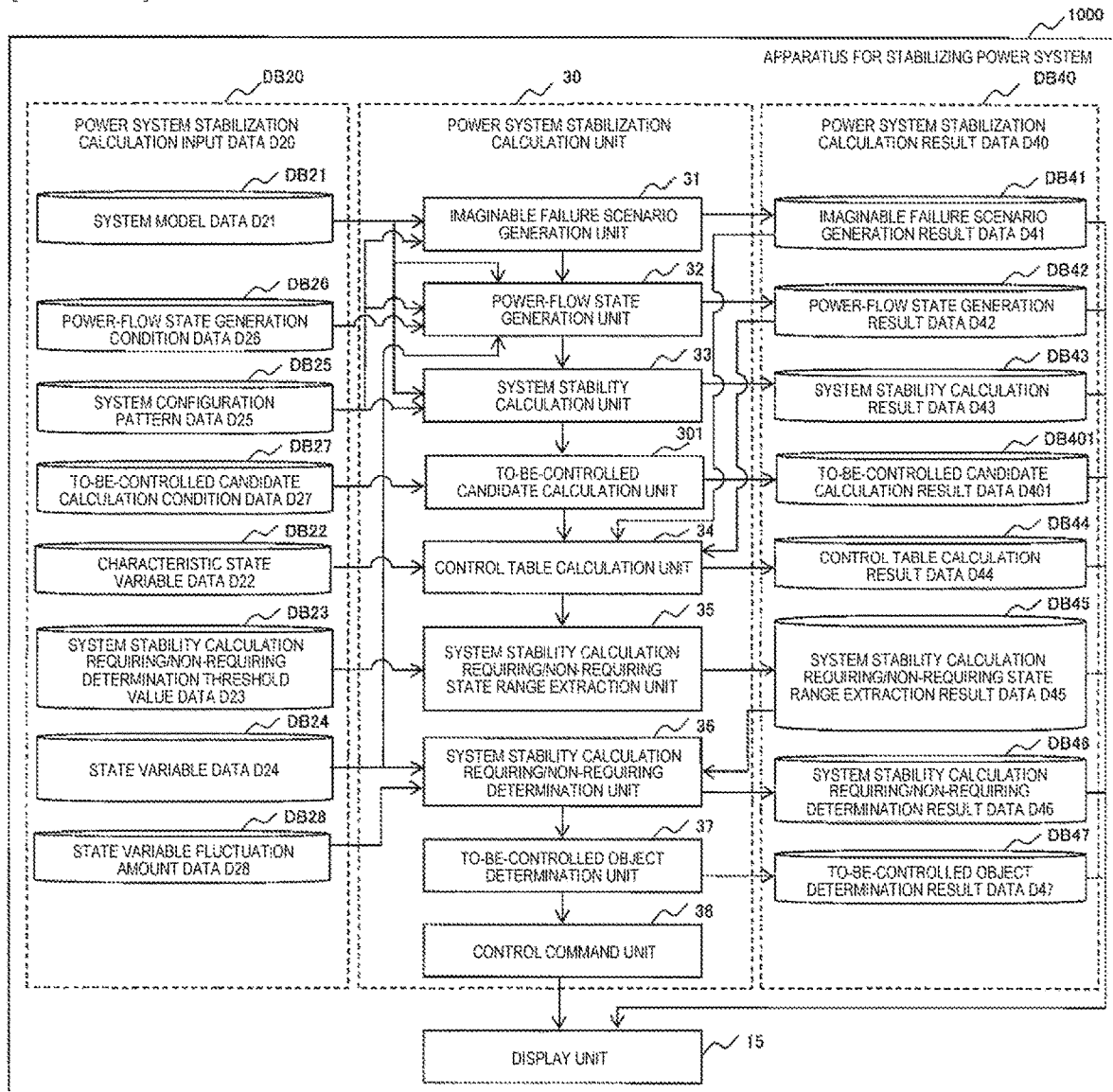
[FIG. 19]

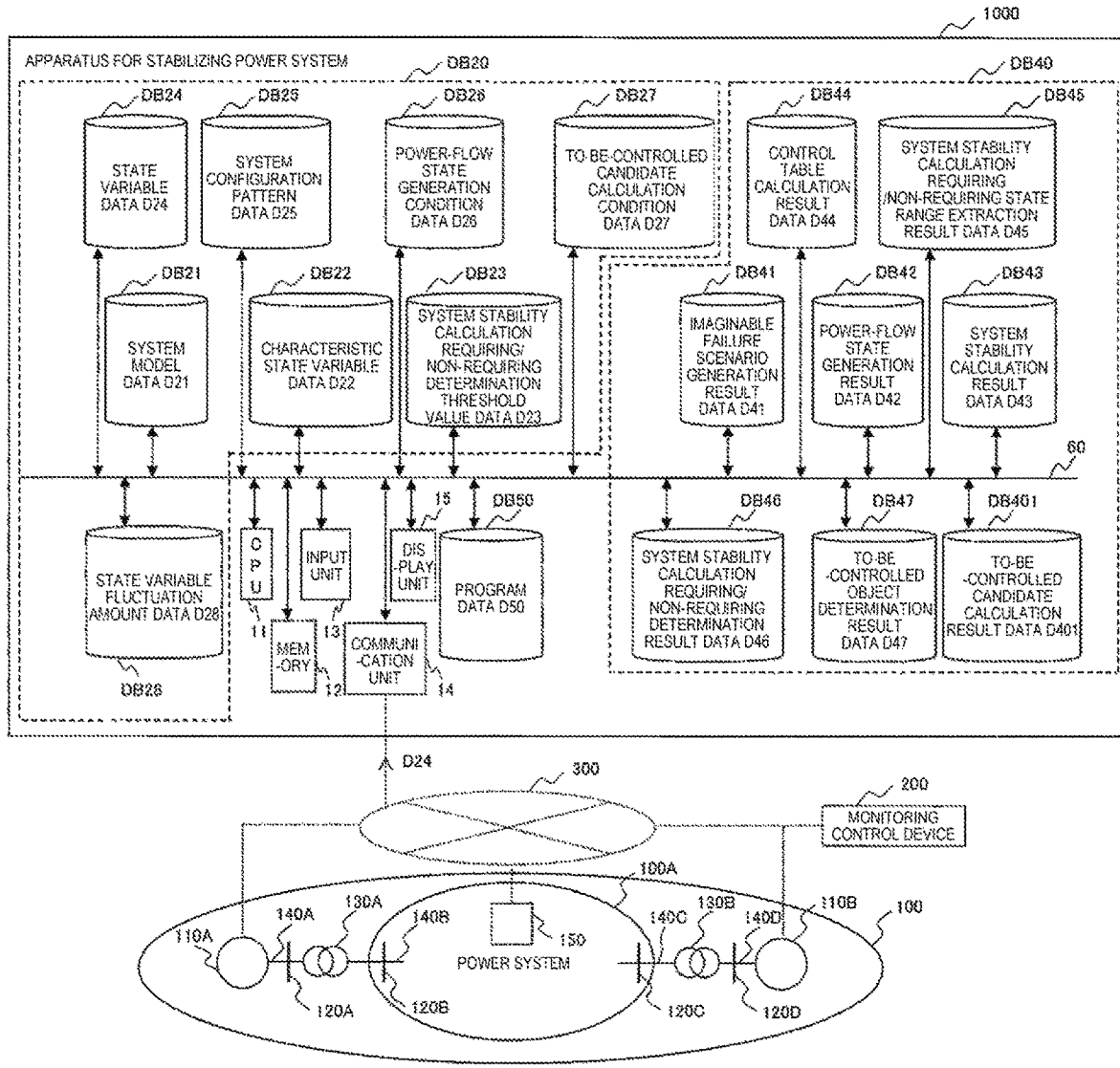
[FIG. 20]

[FIG. 21]
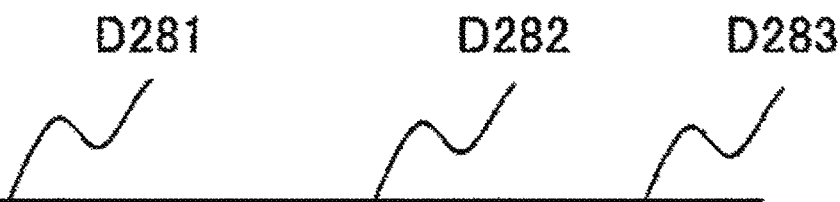

[FIG. 22]
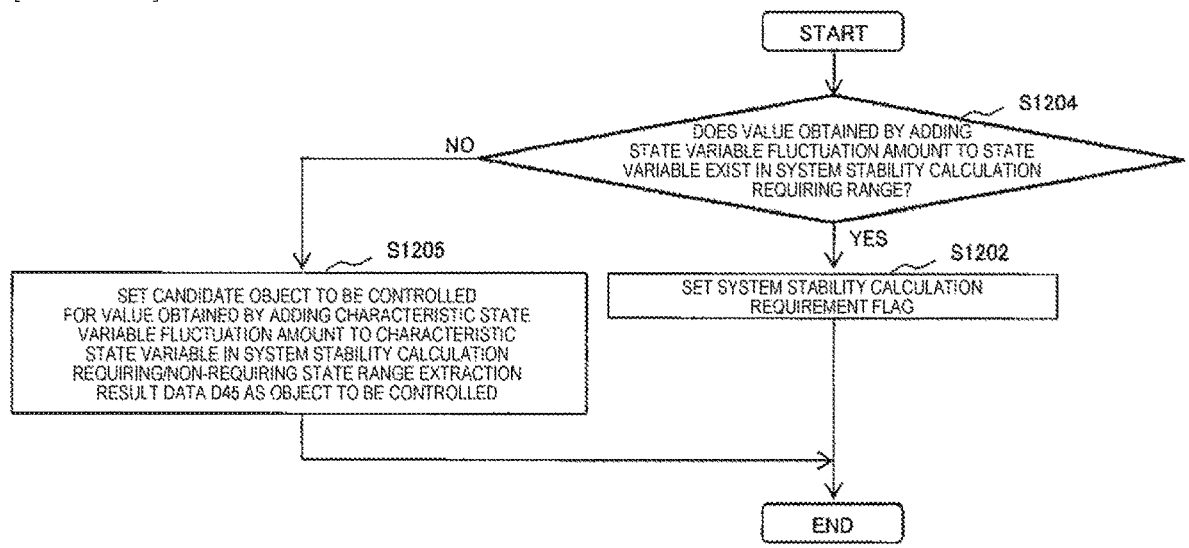

[FIG. 23]

APPARATUS AND METHOD FOR STABILIZING POWER SYSTEM

TECHNICAL FIELD

The present invention relates to an apparatus and a method for stabilizing a power system.

BACKGROUND ART

JP-A-2011-166888 (PTL 1) is known as a background art related to an apparatus for stabilizing a power system. PTL 1 describes "a voltage stabilizing apparatus including: a detector that detects an accident position of a power-transmission line installed in a power system; a phase shifter that is disposed in each of buses of a plurality of substations or the like connected to the power-transmission line and controls a reactive power supplied to each of the buses; and a control device that controls blocking or inputting of at least one equipment among a plurality of generators that supply power to the power-transmission line and the phase shifter such that voltage stability of the power system including the bus can be maintained in a case where the detector detects the accident position of the power-transmission line".

In the future, when a large amount of renewable energy (solar power generation or wind power generation) is introduced into the power system, uncertain and steep power-flow fluctuation occurs. In response to the problem, PTL 1 suggests an apparatus for stabilizing a power system which forms a stabilization measure at the time of occurrence of a failure from periodic online measurement information.

CITATION LIST

Patent Literature

PTL 1: JP-A-2011-166888

SUMMARY OF INVENTION

Technical Problem

In PTL 1, however, since calculation of system stability is, in online calculation, performed regarding all imaginable failure cases for the combinations of all objects to be controlled to determine an object to be controlled, there has been a problem of not being able to determine an object to be controlled in all the imaginable failure cases within a calculation period due to longer calculation time.

Therefore, an object of the present invention is to provide an apparatus for stabilizing a power system and a method for stabilizing a power system capable of shortening online calculation time.

Solution to Problem

The present invention has been made in consideration of the above-described problem, and an object thereof is to provide an apparatus for stabilizing a power system, including: an imaginable failure scenario generation unit that generates an imaginable failure scenario by using system model data and system configuration pattern data; a power-flow state generation unit that generates a power-flow state of a power system by using generation result data of the imaginable failure scenario, the system model data, state variable data, power-flow state generation condition data, and the system configuration pattern data; a system stability calculation unit that calculates system stability of the power system by using generation result data of the power-flow state, the system model data, and the system configuration pattern data; a to-be-controlled candidate calculation unit that calculates a candidate object to be controlled for stabilization of the power system by using calculation result data of the system stability and to-be-controlled candidate calculation condition data; a control table calculation unit that calculates a control table by using calculation result data of the candidate object to be controlled; a system stability calculation requiring/non-requiring state range extraction unit that extracts a state range where stability calculation of the power system is required and a state range where stability calculation is not required by using calculation result data of the control table and system stability calculation requiring/non-requiring determination threshold value data; and a system stability calculation requiring/non-requiring determination unit that determines whether or not stability calculation of the power system is required by using extraction result data of the state range and the state variable data.

Advantageous Effects of Invention

According to the present invention, online calculation time can be shortened.

BRIEF DESCRIPTION OF DRAWINGS

FIG. 1 is a diagram illustrating an overall configuration example of an apparatus for stabilizing a power system 10 according to Example 1.

FIG. 2 is a diagram illustrating an overall configuration example of a power system stabilizing system in a case where the apparatus for stabilizing a power system of FIG. 1 is applied to a power system.

FIG. 3 is a diagram illustrating a configuration example illustrating contents of program data of the apparatus for stabilizing a power system.

FIG. 4 is a diagram illustrating an example of characteristic state variable data D22 stored in a characteristic state variable database DB22.

FIG. 5 is a diagram illustrating an example of state variable data D24 stored in a state variable database DB24.

FIG. 6 is a diagram illustrating an example of system configuration data D25 stored in a system configuration pattern database DB25.

FIG. 7 is a diagram illustrating an example of imaginable failure scenario generation result data D41 stored in an imaginable failure scenario generation result database DB41.

FIG. 8 is a diagram illustrating an example of power-flow state generation result data D42 stored in a power-flow state generation result database DB42.

FIG. 9 is a diagram illustrating an example of control table generation result data D44 stored in a control table generation result database DB44.

FIG. 10 is a diagram illustrating an example of system stability calculation requiring/non-requiring state range extraction result data D45 stored in a system stability calculation requiring/non-requiring state range extraction result database DB45.

FIG. 11 is a flowchart illustrating an example of offline calculation processing contents of the apparatus for stabilizing a power system.

FIG. 12 is a flowchart illustrating an example of online calculation processing contents of the apparatus for stabilizing a power system.

FIG. 13 is a detailed flowchart of processing step S400 in FIG. 11.

FIG. 14 is a detailed flowchart of processing step S1000 in FIG. 11.

FIG. 15 is a detailed flowchart of processing step S1200 in FIG. 12 according to Example 1.

FIG. 16 is a diagram illustrating a screen display example of the apparatus for stabilizing a power system according to Example 1.

FIG. 17 is a diagram illustrating an example of power-flow state generation condition data D26 stored in a power-flow state generation condition database D26.

FIG. 18 is a diagram illustrating an example of to-be-controlled candidate calculation condition data D27 stored in a to-be-controlled candidate calculation condition database DB27.

FIG. 19 is a diagram illustrating an overall configuration example of an apparatus for stabilizing a power system 1000 according to Example 2.

FIG. 20 is a diagram illustrating an overall configuration example of a power system stabilizing system in a case where the apparatus for stabilizing a power system of FIG. 19 is applied to a power system.

FIG. 21 is a diagram illustrating an example of state variable fluctuation amount data D28 stored in a state variable fluctuation amount database DB28.

FIG. 22 is a detailed flowchart of processing step S1200 in FIG. 11 according to Example 2.

FIG. 23 is a diagram illustrating a screen display example of the apparatus for stabilizing a power system according to Example 2.

DESCRIPTION OF EMBODIMENTS

Hereinafter, examples of the present invention will be described with reference to the drawings.

Example 1

FIG. 1 is a diagram illustrating an overall configuration example of an apparatus for stabilizing a power system 10 according to Example 1. In addition, FIG. 1 illustrates the apparatus for stabilizing a power system 10 from the viewpoint of the functional configuration thereof.

The apparatus for stabilizing a power system 10 includes a power system stabilization calculation input database DB20, a power system stabilization calculation unit 30, a power system stabilization calculation result database DB40, and a display unit 15.

The power system stabilization calculation input database DB20 is configured with a plurality of databases DB21 to DB27.

Among these, the characteristic state variable database DB22 stores characteristic state variable data D22 exemplified in FIG. 4. The state variable database DB24 stores state variable data D24 exemplified in FIG. 5. The system configuration pattern database DB25 stores system configuration pattern data D25 exemplified in FIG. 6. The power-flow state generation condition database DB26 stores power-flow state generation condition data D26 exemplified in FIG. 17. The to-be-controlled candidate calculation condition database DB27 stores to-be-controlled candidate calculation condition data D27 exemplified in FIG. 18. Detailed examples of the stored contents will be described later.

The power system stabilization calculation unit 30 is a function of performing stabilization calculation of a power system at the time of occurrence of an imaginable failure, and the series of processing contents is illustrated in the flowcharts of FIG. 11 and FIG. 12. In addition, the functions of the processing in the power system stabilization calculation unit are the following processing function units 31 to 301.

Among these, the imaginable failure scenario generation unit 31 is a function of generating an imaginable failure scenario. The power-flow state generation unit 32 is a function of generating a power-flow state, and the series of processing contents is illustrated in the flowchart of FIG. 13. The system stability calculation unit 33 is a function of calculating the stability of the power system. The to-be-controlled candidate calculation unit 301 is a function of calculating the candidate object to be controlled for stabilization of the power system. The control table calculation unit 34 is a function of generating a control table. The system stability calculation requiring/non-requiring state range extraction unit 35 is a function of extracting a state range where online stability calculation of the power system is required and a state range where online stability calculation is not required, and the series of processing contents is illustrated in the flowchart of FIG. 14. The system stability calculation requiring/non-requiring determination unit 36 is a function of determining whether or not the online stability calculation of the power system is required, and the series of processing contents is illustrated in the flowchart of FIG. 15. The to-be-controlled object determination unit 37 is a function of determining an object to be controlled. The control command unit 38 is a function of commanding a control.

The power system stabilization calculation result database DB40 is configured with a plurality of databases DB41 to DB401. In short, the plurality of databases DB41 to DB401 accumulate and store processing results of the processing function units 31 to 301, respectively.

Among these, the imaginable failure scenario generation result database DB41 stores an imaginable failure scenario generation result data D41 generated in the imaginable failure scenario generation unit 31. The power-flow state generation result database DB42 stores a power-flow state generation result data D42 generated in the power-flow state generation unit 32. The system stability calculation result database DB43 stores a system stability calculation result data D43 generated in the system stability calculation unit 33. The to-be-controlled candidate calculation result database DB401 stores a to-be-controlled candidate result data D401 calculated in the to-be-controlled candidate calculation unit 301. The control table generation result database DB44 stores a control table calculation result data D44 generated in the control table calculation unit 34. The system stability calculation requiring/non-requiring state range extraction result database DB45 stores a system stability calculation requiring/non-requiring state range extraction result data D45 generated in the system stability calculation requiring/non-requiring state range extraction unit 35. The system stability calculation requiring/non-requiring determination result database DB46 stores a system stability calculation requiring/non-requiring determination result data D46 generated in the system stability calculation requiring/non-requiring determination unit 36. The to-be-controlled object determination result database DB47 stores a to-be-controlled object determination result data D47 generated in the to-be-controlled object determination unit 37. In addition, these data stored in the power system stabilization calculation result database DB40 are stored including not only data on calculation results but also data on results at the time of intermediate processing, and can be utilized in an appropriate situation.

Various pieces of data to be handled in the apparatus for stabilizing a power system 10 is processed and displayed appropriately in a manner of being easily viewed in the display unit 15. In addition, the function of the display unit 15 includes input means, such as a mouse or a keyboard, and the input result is appropriately reflected on a display screen.

As described above, the input data of the apparatus for stabilizing a power system 10 is kept and stored in the power system stabilization calculation input database DB20, and these data are system model data D21, the characteristic state variable data D22, system stability calculation requiring/non-requiring determination threshold value data D23, the state variable data D24, the system configuration pattern data D25, the power-flow state generation condition data D26, the to-be-controlled candidate calculation condition data D27, and the like.

In the imaginable failure scenario generation unit 31 of the apparatus for stabilizing a power system 10, by using the system model data D21 and the system configuration pattern data D25, the imaginable failure scenario is generated and the imaginable failure scenario generation result data D41 is output.

In addition, in the power-flow state generation unit 32 of the apparatus for stabilizing a power system 10, by using the imaginable failure scenario generation result data D41, the system model data D21, the state variable data D24, the system configuration pattern data D25, and the power-flow state generation condition data D26, the power-flow state is generated and the power-flow state generation result data D42 is output.

In addition, in the system stability calculation unit 33 of the apparatus for stabilizing a power system 10, by using the power-flow state generation result data D42, the system model data D21, and the system configuration pattern data D25, the stability of the power system is calculated and the system stability result data D43 is output.

In addition, in the to-be-controlled candidate calculation unit 301 of the apparatus for stabilizing a power system 10, by using the system stability calculation result data D43 and the to-be-controlled candidate calculation condition data D27, the candidate object to be controlled for stabilization of the power system is calculated and the to-be-controlled candidate calculation result data D401 is output.

In addition, in the control table calculation unit 34 of the apparatus for stabilizing a power system 10, by using the imaginable failure scenario generation result data D41, the power-flow state generation result data D42, and the to-be-controlled candidate calculation result data D401, the control table is calculated and the control table calculation result data D44 is output.

In addition, in the system stability calculation requiring/non-requiring state range extraction unit 35 of the apparatus for stabilizing a power system 10, by using the control table calculation result data D44 and the system stability calculation requiring/non-requiring determination threshold value data D23, the state range where the online stability calculation of the power system is required and the state range where the online stability calculation is not required are extracted, and the system stability calculation requiring/non-requiring state range extraction result data D45 is output.

In addition, the system stability calculation requiring/non-requiring determination unit 36 of the apparatus for stabilizing a power system 10 uses the system stability calculation requiring/non-requiring state range extraction result data D45 and the state variable data D24 to determine whether or not the online stability calculation of the power system is required and outputs the system stability calculation requiring/non-requiring determination result data D46.

In addition, the to-be-controlled object determination unit 37 of the apparatus for stabilizing a power system 10 uses the system stability calculation requiring/non-requiring determination result data D46 to determine an object to be controlled and outputs the to-be-controlled object determination result data D47.

In addition, the control command unit 38 of the apparatus for stabilizing a power system 10 uses the to-be-controlled object determination result data D47 to command a control.

In addition, in the display unit 15 of the apparatus for stabilizing a power system 10, the information of each calculation result is displayed by using the power system stabilization calculation result data D40 and the like.

FIG. 2 is a diagram illustrating an overall configuration example of the power system stabilizing system of a case where the apparatus for stabilizing a power system of FIG. 1 is applied to the power system. In addition, the configuration of the apparatus for stabilizing a power system 10 in FIG. 2 is described from a point of a view of a hardware configuration.

In FIG. 2, the power system 100 to which the apparatus for stabilizing a power system 10 is applied means a transmission system 100A in a narrow sense, and is a concept including a power generation system in a broad sense. In the drawing, an example in which the power system 100 is configured with power generators 110 (110A and 110B), buses 120 (nodes 120A, 120B, 120C, and 120D), transformers 130 (130A and 130B), power-transmission lines 140 (branches 140A, 140B, 140C, and 140D) or the like is described, but in addition to this, any one of loads and other controllable devices (battery, rechargeable battery, EV storage battery, flywheel, and the like) or a plurality of facilities is/are included to configure.

The above-described facilities or equipment that configures the power system are monitored and controlled from a point of view of ensuring the stability of the power system, and appropriate control and protection are executed by, for example, a control signal from a monitoring control device 200. Meanwhile, for the monitoring and controlling, measurement signals D13, such as currents, voltages, and other state signals at various places are taken into the monitoring control device 200 directly or indirectly via a communication network 300 from various measurement devices 150 installed in various places of the power system. In addition, similarly by the apparatus for stabilizing a power system 10, the measurement signals are taken from various measurement devices 150. Here, as the generator 110, in addition to a large power source, such as a thermal power generator, a hydraulic power generator, or a nuclear power generator, a distribution type power source, such as solar power generation or wind power generation, is included.

Here, the measurement device 150 is a device (an instrumental potential transformer (VT: Voltage Transformer, PT: Potential Transformer) or an instrumental current transformer (CT: Current Transformer)) that measures any one or a plurality of a node voltage V, a branch current I, a power factor $\Phi$, an active power P, and a reactive power Q, and has a function (TM: telemeter) that transmits data including a data measurement location identification ID or a built-in time stamp of the measurement device. In addition, the measurement device 150 may be a device for measuring power information (phasor information of voltage) with absolute time using GPS, a phase measurement device (PMU: Phasor Measurement Units), or other measurement equipment. In addition, the measurement device 150 is described to be in the power system 100A of a narrow sense, but maybe installed in a bus or a line connected to the generator 110, the transformer 130, the measurement device 150, the load, and the like.

In addition, the measurement signal D24 is each piece of the above-described data (state variable data) measured by the measurement device 150, and is received by the system database DB24 via the communication network 300. However, instead of receiving the system data directly from the measurement device 150, the system data maybe received in the state variable database DB24 via the communication network 300 after being collected and contracted in the monitoring control device 200, or may be received in the state variable database DB24 from both the measurement device 150 and the monitoring control device 200 via the communication network 300. In addition, the state variable data D24 may include an intrinsic number for identifying the data and a time stamp. In addition, the state variable data D24 is written to be measured data, but may be held in the system database in advance.

A hardware configuration of the apparatus for stabilizing a power system 10 illustrated in FIG. 2 will be described. In the apparatus for stabilizing a power system 10, the display unit 15, an input unit 13, such as a keyboard or a mouse, a communication unit 14, a computer or a computer server (CPU: central processing unit) 11, a memory 12, the power system stabilization calculation input database DB20 (the system model database DB21, the characteristic state variable database DB22, the system stability calculation requiring/non-requiring determination threshold value database DB23, the state variable database DB24, the system configuration pattern database DB25, the power-flow state generation condition database DB26, and the to-be-controlled candidate calculation condition database DB27), the power system stabilization calculation result database DB40 (the imaginable failure scenario generation result database DB41, the power-flow state generation result database DB42, the system stability calculation result database DB43, the control table calculation result database DB44, the system stability calculation requiring/non-requiring state range extraction result data DB45, the system stability calculation requiring/non-requiring determination result database DB46, the to-be-controlled object determination result database DB47, and the to-be-controlled candidate calculation result database DB401), and the program database DB 50 are connected to a bus line 60.

Among these, the display unit 15 is configured as, for example, a display device. In addition, the display unit 15 maybe configured to use a printer device, a voice output device or the like, for example, instead of the display device or in addition to the display device.

The input unit 13 can be configured to include at least one of a keyboard switch, a pointing device, such as a mouse, a touch panel, a voice instruction device, and the like.

The communication unit 14 has a circuit and a communication protocol for being connected to the communication network 300.

The CPU 11 reads and executes a predetermined computer program from the program database DB50. The CPU 11 may be configured as one or a plurality of semiconductor chips, or may be configured as a computer device, such as a calculation server.

The memory 12 is configured as, for example, a random access memory (RAM), stores a computer program read out from the program database 50, and stores calculation result data, image data, and the like necessary for each processing. The screen data stored in the memory 12 is sent to the display unit 15 and displayed. An example of the displayed screen will be described later.

Here, with reference to FIG. 3, the stored contents of the program database DB50 will be described. FIG. 3 is a diagram illustrating a configuration example illustrating contents of the program data of the apparatus for stabilizing a power system 10. In the program database DB50, for example, an imaginable failure scenario generation program P51, a power-flow state generation program P52, a system stability calculation program P53, a to-be-controlled candidate calculation program P501, a control table calculation program P54, a system stability calculation requiring/non-requiring state range extraction program P55, a state estimation program P56, a system stability calculation requiring/non-requiring determination program P57, a to-be-controlled object determination program P58, a control command program P59, and a display program P502, are stored.

Returning to FIG. 2, the CPU 11 executes the calculation programs (the imaginable failure scenario generation program P51, the power-flow state generation program P52, the system stability calculation program P53, the to-be-controlled candidate calculation program P501, the control table calculation program P54, the system stability calculation requiring/non-requiring state range extraction program P55, the state estimation program P56, the system stability calculation requiring/non-requiring determination program P57, the to-be-controlled object determination program P58, the control command program P59, and the display program P502) read out from the program database DB50 to the memory 112, and performs generation of the imaginable failure scenario, the generation of the power-flow state, the stability calculation of the power system, the calculation of candidate object to be controlled for stabilization of the power system, the generation of the control table, the extraction of the state range where the online stability calculation of the power system is required and the state range where the online stability calculation is not required, the determination on whether or not the online stability calculation of the power system is required, the determination of the object to be controlled, the command of the control, the command of image data to be displayed, searching of the data in various databases, and the like.

The memory 12 is a memory for temporarily storing calculated temporary data and calculation result data, such as image data for display, system stability calculation requiring/non-requiring determination result data, and to-be-controlled object determination result data, allows the CPU 11 to generate and display necessary image data on the display unit 15 (for example, the display screen) . In addition, the display unit 15 of the apparatus for stabilizing a power system 10 maybe a simple screen only for rewriting each control program or database.

In the apparatus for stabilizing a power system 10, 16 databases DB are stored when roughly dividing. Hereinafter, except for the program database DB50, the power system stabilization calculation input database DB20 (the system model database DB21, the characteristic state variable database DB22, the system stability calculation requiring/non-requiring determination threshold value database DB23, the state variable database DB24, the system configuration pattern database DB25, the power-flow state generation condition database DB26, and the to-be-controlled candidate calculation condition database DB27), the power system stabilization calculation result database DB40 (the imaginable failure scenario generation result database DB41, the power-flow state generation result database DB42, the system stability calculation result database DB43, the to-be-controlled candidate calculation result database DB401, the control table calculation result database DB44, the system stability calculation requiring/non-requiring state range extraction result data DB45, the system stability calculation requiring/non-requiring determination result database DB46, and the to-be-controlled object determination result database DB47), will be described.

First, in the system model database DB21, the system model data D21 is stored as a system configuration, a line impedance (R+jX), an earth capacity (admittance: Y), data necessary for the system configuration and the state estimation (threshold value of bat data, or the like), generator data, and other data required for power-flow calculation, state estimation, and time series change calculation. In addition, when inputting manually, the data is manually input by the input unit 13 and stored. Further, when inputting the data, necessary image data is generated by the CPU 11 and displayed on the display unit 15. When inputting the data, by using a complementary function, the data may be input semi-manually such that a large amount of data can be set.

In the characteristic state variable database DB22, as illustrated in FIG. 4, the characteristic state variable data D22 is stored as data, such as a failure location (D221) and a failure aspect (D222) in the imaginable failure scenario, and a location and a type (D224) in the power system of the state variable (D223). The failure aspect (D222) is 3ϕ6LG (ABCA'B'C') and the like, and this indicates that the A phase, the B phase, the C phase, the A' phase, the B' phase, and the C' phase are grounded in three-phase six-wire ground fault. For the location and type of the characteristic state variable for each imaginable failure scenario, for example, those which largely correlate with the stability of the power system or the object and the amount to be controlled for stabilization are extracted in advance. The accuracy of the online stabilization calculation is improved as the number of characteristic state variables increases, but the calculation amount in the power-flow state generation unit 32 increases, and thus, it is preferable that the number of characteristic state variables can be changed in accordance with the degree of the stability of the power system for each imaginable failure scenario.

In the system stability calculation requiring/non-requiring determination threshold value database DB23, the system stability calculation requiring/non-requiring determination threshold value data D23 is stored as data, such as numerical values. As the value increases, the range where the stability calculation of the power system is required increases, and thus, the accuracy of the online stabilization calculation is improved, but because the online calculation amount in the to-be-controlled object determination unit 37 becomes large, the value may be changed in accordance with a desired accuracy of the power system stabilization calculation.

In the state variable database DB24, as illustrated in FIG. 5, the state variable data D24 is stored as data, such as a location in the power system of the state variable (D241), a type (D242), and a value (D243). Examples of the type of the state variable (D242) are the active power P, the reactive power Q, the voltage V, the voltage phase angle δ, the current I, the power factor Φ, and the like. The type maybe data with a time stamp or PMU data. For example, a voltage and a voltage phase angle at the node 120B or 120C connected to the power system 100, a line power flow (P+jQ) of the branches 140B or 140C connected to the nodes 120B or 120C connected to the power system 100, a line power flow (P+jQ) of the transformer 130A or 130B connected to the node 120B or 120C connected to the power system 100, a voltage V and a voltage phase angle δ of the node 120A or 120D connected to the transformer 130A or 130B, the active power P, the reactive power Q, or the power factor Φ of the generator 11A or 110B connected to the node 120A or 120D, the active power P, the reactive power Q, the power factor Φ, or the voltage V and the voltage phase angle δ of other nodes, branches, generators, loads, or control devices which are connected to the power system 100 that performs measurement from the measurement device 150 or the monitoring control device 200 via the communication network. In addition, the voltage phase angle δ may be measured by using PMU or another measuring instrument that uses GPS. In addition, the measurement device is VT, PT, or the like. The line power flow (P+jQ) can be calculated from the current I, the voltage V, and the power factor Φ measured by VT or PT. Further, the result obtained by estimating and calculating the active power P, the reactive power Q, the voltage V, the voltage phase angle δ, the current I, and the power factor Φ of each node, branch, generator, load, and control device of a maximum likely system, which is the calculation result of the state estimation calculation program P56, is also stored as the system measurement data.

In the system configuration pattern database DB25, as illustrated in FIG. 6, the system configuration pattern data D25 is stored as data, of a location (D251), a state (D252) and the like in the power system. The location (D251) is the power-transmission line and the like of the target power system, and the state is the on and off state or the like of the power-transmission line. Since the calculation amount in the power-flow state generation unit 32 and the system stability calculation unit 33 increases as the number of system configuration patterns increases, for example, a system configuration pattern with high frequency is extracted in advance based on operational performance data and the like. In addition, the system configuration having the close influence on the stability of the power system may be classified in advance, and the system configuration pattern of representatives of each classification may be extracted in advance.

In the power-flow state generation condition database DB26, as illustrated in FIG. 17, the power-flow state generation condition state D26 is stored as data of a numerical value change target (D261), a change target type (D262), a numerical maximum value (D263), a numerical minimum value (D264), and the numerical change increment (D265) and the like. By setting the maximum value and the minimum value for each type of the change target, the number of power-flow states to be generated can be limited. Accordingly, the calculation amount in the power-flow state generation unit 32 can be reduced. The accuracy of the power system stabilization calculation is improved as the change increment of the value decreases, but since the calculation amount in the power-flow state generation unit 32 increases, the magnitude of the change increment may change in accordance with the desired power system stabilization control accuracy.

In the to-be-controlled candidate calculation condition database DB27, as illustrated in FIG. 18, the to-be-controlled candidate calculation condition data D27 is stored as data, such as a type of stability (D271), an indicator (D272), and a threshold value (D273). The types of stability are transient stability (also referred to as transient stability degree), voltage stability, overload, steady state stability and the like, the indicator is the internal operating angle of the generator, stability margin, line power flow, and intrinsic value of characteristic matrix of the power system, but other indicators may be used.

In the power system stabilization calculation result database DB40 of FIG. 1, the imaginable failure scenario generation result data D41 generated by the imaginable failure scenario generation program P51 using the system model data D21 and the system configuration pattern data D25 are stored in the imaginable failure scenario generation result database DB41. FIG. 7 illustrates an example of the generation result of the imaginable failure scenario, and data, such as a failure location (D411) and a failure aspect (D412) is stored. A method for generating the imaginable failure scenario will be described later.

In the power-flow state generation result database DB42, the power-flow state generation result data D42 generated by the power-flow state generation program P52 using the imaginable failure scenario generation result data D41, the system model data D21, the state variable data D24, and the system configuration pattern data D25 are stored. FIG. 8 illustrates an example of the power-flow state generation result, and data, such as a target (D421), a type (D422), and a value (D423), is stored. The target is the generator and the load that exist in the power system, and the type is the active power P and the voltage V in the generator, and is the active power P, the reactive power Q, and the like in the load. A method for generating the power-flow state will be described later.

In the system stability calculation result database DB43, the system stability calculation result data D43 calculated by the system stability calculation program P53 using the power-flow state generation result data D42, the system model data D21, and the system configuration pattern data D25 are stored. A method for calculating the system stability will be described later.

In the to-be-controlled candidate calculation result database DB401, the to-be-controlled candidate calculation result data D401 calculated by the to-be-controlled candidate calculation program P501 using the system stability calculation result data D43 and the to-be-controlled candidate calculation condition data D27 are stored. A method for calculating the candidate object to be controlled will be described later.

In the control table calculation result database DB44, the control table calculation result data D44 calculated by the control table calculation program P54 using the imaginable failure scenario generation result data D41, the power-flow state generation result data D42, and the to-be-controlled candidate calculation result data D401 are stored. FIG. 9 illustrates an example of the control table generation result, in which data, such as each imaginable failure scenario (D441), values of each characteristic state variable (D441 and D442), and a candidate object to be controlled (D444) at this time are stored. The number of characteristic state variables is two in the example illustrated in FIG. 9, but is as many as the number of corresponding characteristic state variables stored in the characteristic state variable data D22 for each imaginable failure scenario. A method for calculating the control table will be described later.

In the system stability calculation requiring/non-requiring state range extraction result database DB45, the system stability calculation requiring/non-requiring determination result data D46 extracted by the system stability calculation requiring/non-requiring state range extraction program P55 using the control table calculation result data D44 and the system stability calculation requiring/non-requiring determination threshold value data D23 are stored. FIG. 10 illustrates an example of the system stability calculation requiring/non-requiring state range extraction result, and data, such as each imaginable failure scenario (D451), ranges of each state variable (D452 and D453), the candidate object to be controlled at the time of the range (D454), and system stability calculation requiring/non-requiring determination result (D455), is stored. A method for extracting the system stability calculation requiring/non-requiring state range will be described later.

In the system stability calculation requiring/non-requiring determination result database D46, the system stability calculation requiring/non-requiring determination result data D46 determined by the system stability calculation requiring/non-requiring determination program P57 using the system stability calculation requiring/non-requiring state range extraction result data D46 and the state variable data D24 are stored. A method for determining whether or not the system stability calculation is required will be described later.

In the to-be-controlled object determination result database D47, the to-be-controlled object determination result data D47 determined by the to-be-controlled object determination program using the system stability calculation requiring/non-requiring determination result data D46 are stored. A method for determining the object to be controlled will be described later.

Next, an example of the calculation processing contents of the apparatus for stabilizing a power system 10 will be described with reference to FIGS. 11 and 12. FIGS. 11 and 12 are examples of flowcharts illustrating the overall processing of the apparatus for stabilizing a power system 10, FIG. 11 illustrates offline processing, and FIG. 12 illustrates online processing.

First, the flow of the offline processing will be described with reference to FIG. 11. In processing step S100, by using the system model data D21 and the state variable data D24, the imaginable failure scenario is generated and stored in the imaginable failure scenario generation result database D41.

In processing step S200, by using the imaginable failure scenario generation result data D41, the system model data D21, the state variable data D24, the system configuration pattern data D25, and the power-flow state generation condition data D26, the power-flow state is generated and the generation result is stored in the power-flow state generation result database DB42.

Here, the flow of the power-flow state generation by processing step S200 of FIG. 11 will be described in more detail with reference to FIG. 13. FIG. 13 is an example of a flowchart for describing the processing of the power-flow state generation unit 32 in FIG. 1.

In processing step S201, a combination of generators stored in the power-flow state generation condition data D26 is selected.

In processing step S202, a combination of loads stored in the power-flow state generation condition data D26 is selected.

In processing step S203, the effective output and the terminal voltage of each generator in the combination of generators selected in processing step S201 are set.

In processing step S204, an effective load value and an invalid load value of each load in the combination of loads selected in processing step S202 are set.

In processing step S205, the power-flow calculation is performed based on each generator output and each load value set in processing steps S203 and processing step S204. The method of the power-flow calculation is performed according to the calculation method described, for example, in pp. 45 to 48 of "power system stabilization system engineering" written by Yokoyama Akihiko and Ota Koji and published by the Institute of Electrical Engineers in 2014.

In processing step S206, it is determined whether or not the power-flow calculation in processing step S205 has converged. In a case where the power-flow calculation has converged, the process proceeds to processing step S207, and in a case where the power-flow calculation has not converged, the process proceeds to processing step S208.

In processing step S207, the result of the power-flow calculation of processing step S205 is stored in power-flow state generation result database DB42.

In processing step S208, it is determined that all the effective load values and invalid load values of the selected load become the maximum value or the minimum value stored in the power-flow state generation condition data D26 for the load combination selected in processing step S202. In a case where the maximum value or the minimum value is achieved, the processing proceeds to processing step S209. In a case where the maximum value or the minimum value is not achieved, the processing returns to processing step S204.

In processing step S209, it is determined whether all the outputs and terminal voltages of the selected generator become the maximum value or the minimum value stored in the power-flow state generation condition data D26 for the generator combination selected in processing step S201. In a case where the maximum value or the minimum value is achieved, the processing proceeds to processing step S210. In a case where the maximum value or the minimum value is not achieved, the processing returns to processing step S203.

In processing step S210, it is determined whether or not all the combinations of the loads have been selected. In a case where all the combinations of the loads have been selected, the process proceeds to processing step S211. In a case where all the combinations of the loads have not been selected, the process returns to processing step S201.

In processing step S211, it is determined whether or not all the combinations of the generators have been selected. In a case where all the combinations of the generators have been selected, the process ends processing step S200. In a case where all the combinations of the generators have not been selected, the process returns to processing step S201.

Accordingly, it is possible to efficiently generate various power-flow state data imagined in operation.

Returning to FIG. 11, in processing step S500, by using the power-flow state generation result data D42, the system model data D21, and the system configuration pattern data D25, the stability of the power system is calculated and the calculation result is stored in the system stability calculation result data DB43. The stability is calculated based on numerical simulation result performed according to the calculation method described, for example, in pp. 54 to 57 of "power system stabilization system engineering" written by Yokoyama Akihiko and Ota Koji and published by the Institute of Electrical Engineers in 2014. Stability includes, for example, transient stability, voltage stability, and the like. The calculation indicator of the transient stability is, for example, an internal operation angle of a synchronous generator, and in a case where the deviation from the internal operation angle of the reference generator exceeds the threshold value, the transient instability is determined. The calculation indicator of the voltage stability is, for example, the stability margin of a P-V curve described in pp. 42 to 45 of "power system stabilization system engineering" written by Yokoyama Akihiko and Ota Koji and published by the Institute of Electrical Engineers in 2014, the voltage stability is determined in a case where the stability margin exceeds a threshold value.

Accordingly, it is possible to determine the stability of various power systems.

In processing step S600, by using the system stability calculation result data D43 and the to-be-controlled candidate calculation condition data D27, the candidate object to be controlled for stabilization of the power system is calculated and the calculation result is stored in the to-be-controlled candidate calculation result data DB401. As the method for calculating the candidate object to be controlled, for example, for the transient stability, the synchronous generator in which the deviation of the internal operation angle with the reference generator exceeds the threshold value described in the to-be-controlled candidate calculation condition data D27 is set as a candidate object to be controlled. In addition, the method for calculating the candidate object to be controlled may be performed according to the method of online TSC system loading described in pp. 189 to 191 of "power system stabilization system engineering" written by Yokoyama Akihiko and Ota Koji and published by the Institute of Electrical Engineers in 2014, or the like. For the voltage stability, a synchronous generator of which the stability margin exceeds the threshold value described in the to-be-controlled candidate calculation condition data D27 is set as a candidate object to be controlled. In addition, the calculation method is an example, and other calculation methods may be used.

Accordingly, it is possible to calculate the object to be controlled for the stability of various power systems. In processing step S700, it is determined whether or not all power-flow states generated in processing step S200 have been selected. In a case where not all power-flow states have been selected, the process proceeds to processing step S800. In a case where not all power-flow states have not been selected, the process returns to processing step S400.

In processing step S800, it is determined whether or not all imaginable failure scenarios generated in processing step S100 have been selected. In a case where all imaginable failure scenarios have been selected, the process proceeds to processing step S900. In a case where all imaginable failure scenarios have not been selected, the process returns to processing step S300.

In processing step S900, by using the imaginable failure scenario generation result data D41, the power-flow state generation result data D42, and the to-be-controlled candidate calculation result data D401, the control table for each imaginable failure scenario is calculated and the calculation result is stored in the control table generation result database DB44.

Accordingly, since the candidate object to be controlled is determined for the combination of the imaginable failure and the power-flow state, it is possible to determine whether or not the online system stability calculation is required for any state variable data measured at the time of the online processing.

In processing step S1000, by using the control table calculation result data D44 and the system stability calculation requiring/non-requiring determination threshold value data D23, the state range where the stability calculation of the power system is required and the state range where the stability calculation is not required are extracted, and are stored in the system stability calculation requiring/non-requiring state range extraction result database DB45.

Here, the flow of the system stability calculation requiring/non-requiring state range extraction by processing step S1000 of FIG. 11 will be described in more detail with reference to FIG. 14. FIG. 14 is an example of a flowchart for describing the processing of the system stability calculation requiring/non-requiring state range extraction unit 35 in FIG. 1.

In processing step S1001, one of the characteristic state variables is selected.

In processing step S1002, a plot point in the control table generated in processing step S900 is increased by one for the characteristic state variable selected in processing step S1001.

In processing step S1003, it is determined whether or not the object to be controlled in the control table has been changed by the processing in processing step S1002. In a case where the object to be controlled have been changed, the process proceeds to processing step S1004. In a case where the object to be controlled have not been changed, the process returns to processing step S1002.

In processing step S1004, it is determined whether or not a system stability calculation requirement flag exists. In a case where the system stability calculation requirement flag exists, the process proceeds to processing step S1005. In a case where the system stability calculation requirement flag does not exist, the process proceeds to processing step S1007.

In processing step S1005, a value obtained by adding the system stability calculation requiring/non-requiring determination threshold value from the value in the control table of the current plot point is set as a system stability calculation requirement upper limit value.

In processing step S1006, the system stability calculation requirement flag is released.

In processing step S1007, a value obtained by subtracting the system stability calculation requiring/non-requiring determination threshold value from the value in the control table of the current plot point is set as a system stability calculation requirement lower limit value.

In processing step S1008, the system stability calculation requirement flag is set.

In processing step S1009, it is determined whether or not the number of plot points in the control table of the selected state variable can be increased. In a case where the number of plot points can be increased, the process returns to processing step S1002. In a case where the number of plot points cannot be increased, the process proceeds to processing step S1010.

In processing step S1010, a range from the system stability calculation requirement lower limit value set in processing step S1007 to the system stability calculation requirement upper limit value set in processing step S1005 is set in the system stability calculation requiring range.

In processing step S1011, a range other than the system stability calculation requiring range set in processing step S1010 is set in the system stability calculation non-requiring range.

In processing step S1012, it is determined whether or not the characteristic state variable of which the number of plot points in the control table can be increased exists. In a case where the characteristic state variable exists, the process proceeds to processing step S1013. In a case where the characteristic state variable does not exist, the process ends processing step S1000.

In processing step S1013, the number of plot points of the characteristic state variable of which the number of plot points other than the selected characteristic state variable can be increased is increased by one.

Accordingly, it is possible to immediately determine whether or not the calculation of the online system stability is performed from the state variable data measured at the time of the online processing.

Next, the flow of the online processing will be described with reference to FIG. 12. In processing step S1100, by using the state variable data D24, the state of the maximum likely power system is estimated and stored in the state variable database DB24.

In processing step S1200, by using the system stability requiring/non-requiring state range extraction result data D45 and the state variable data D24, it is determined whether or not the stability calculation of the power system is required and the determination result is stored in the system stability calculation requiring/non-requiring determination result database DB46.

Here, the flow of the system stability requiring/non-requiring state range extraction by processing step S1200 of FIG. 12 will be described in more detail with reference to FIG. 15. FIG. 12 is an example of a flowchart for describing the processing of the system stability calculation requiring/non-requiring determination unit 36 in FIG. 1.

In processing step S1201, it is determined whether or not the value of the characteristic state variable in the state variable data D24 exists in the system stability calculation requiring range. In a case where the value of the characteristic state variable exists, the process proceeds to processing step S1202. In a case where the value of the characteristic state variable does not exist, the process proceeds to processing step S1203.

In processing step S1202, the system stability calculation requirement flag is set.

In processing step S1203, by using the system stability calculation requiring/non-requiring state range extraction result data D45, the candidate object to be controlled in the value of the characteristic state variable in the system stability requiring/non-requiring state range extraction result data D45 is set in an object to be controlled.

Accordingly, in a case where it is determined that the online system stability calculation is not required in processing step S1200, the object to be controlled can be determined immediately.

Returning to FIG. 12, in processing step S1300, it is determined whether or not the system stability calculation requirement flag exists. In a case where the system stability calculation requirement flag exists, the process proceeds to processing step S1700. In a case where the system stability calculation requirement flag does not exist, the process proceeds to processing step S1600.

In processing step S1400, the stability of the power system is calculated. The method for calculating the stability is, for example, the same as processing step S500.

In processing step S1500, the system stability calculation requirement flag is released.

In processing step S1600, the object to be controlled for stabilization of the power system is determined. The method for determining the object to be controlled is, for example, the same as processing step S600.

In processing step S1700, control command is given to the object to be controlled set in processing step S1600 or processing step S1203.

Accordingly, the online calculation time can be shortened. Various calculation results obtained in this manner or data accumulated in the memory during the calculation may be sequentially displayed on the screen of the monitoring control device 200. Accordingly, the operator can easily grasp the operational situation of the apparatus for stabilizing a power system 10.

Here, an example of the specific display contents will be described with reference to FIG. 16. FIG. 16 is one that displays a failure scenario 161 which is actually generated, a characteristic state variable 163 for the failure scenario, a value 166 of the characteristic state variable, a system stability calculation requiring/non-requiring determination result 162, a to-be-controlled object determination result 165, a system stability calculation requiring/non-requiring state range extraction result 169, and a characteristic state variable 164 of an object to be displayed in the system stability calculation requiring/non-requiring state range extraction result. The system stability calculation requiring/non-requiring state range extraction result is tabular in FIG. 9, but may be displayed as a graph as illustrated in FIG. 16. In addition, a system diagram 167 and a legend 168 are also displayed in the display of FIG. 16, and thus, the display format which is easy for the user to understand is employed.

As illustrated in FIG. 16, by displaying the power system stabilization calculation result on the screen of the monitoring control device 200 via the apparatus for stabilizing a power system 10 or the communication network 300, in the power system 100, an effect to understand which generator has been controlled at a glance is achieved.

In addition, in a case where a plurality of characteristic state variables exist, it is possible to select a characteristic state variable 164 to be displayed in the system stability calculation requiring/non-requiring state range extraction result, and to confirm the system stability calculation requiring/non-requiring state range extraction result for the selected characteristic state variable.

The apparatus for stabilizing a power system of Example 1 described above generates the imaginable failure scenario by using the system model data D21 and the system configuration pattern data D25; generates the power-flow state by using the imaginable failure scenario generation result data D41, the system model data D21, the state variable data D24, the system configuration pattern data D25, and the power-flow state generation condition data D26; calculates the stability of the power system by using the power-flow state generation result data D42, the system model data D21, and the system configuration pattern data D25; calculates the candidate object to be controlled for stabilization of the power system by using the system stability calculation result data D43 and the to-be-controlled candidate calculation condition data D27; calculates the control table by using the imaginable failure scenario generation result data D41, the power-flow state generation result data D42, and the to-be-controlled candidate calculation result data D401; extracts the state range where the online stability calculation of the power system is required and the state range where the online stability calculation is not required by using the control table calculation result data D44 and the system stability calculation requiring/non-requiring determination threshold value data D23; determines whether or not the online stability calculation of the power system is required by using the system stability calculation requiring/non-requiring state range extraction result data D45 and the state variable data D24; determines the object to be controlled by using the system stability calculation requiring/non-requiring determination result data D46; commands a control by using the to-be-controlled object determination result data D47; and displays the command result and each calculation result.

In addition, in Example 1, the power system stabilizing system in which the apparatus for stabilizing a power system 10 is applied to the power system is configured.

Example 2

In Example 1, the apparatus for stabilizing a power system 10 has been described. The apparatus only calculates whether or not the system stability calculation is required with respect to the state variable data measured at the time of the online calculation, and there is a concern that the stabilization control may fail in a case where the power flow fluctuates during the period from the time of the system stability calculation to the time of control command. In Example 2, an example of the apparatus for stabilizing a power system that improves the system stabilizing performance at the time of the power-flow fluctuation will be described.

Specifically, in Example 2, is configured the apparatus for stabilizing a power system that improves the system stability performance at the time of the power-flow fluctuation by determining whether or not the system stability calculation is required in the system stability calculation requiring/non-requiring determination unit 36 by using the system stability calculation requiring/non-requiring state range extraction result data D45, the state variable data D24, and state variable fluctuation amount data D28.

FIG. 19 illustrates an example of the apparatus for stabilizing a power system according to Example 2. An apparatus for stabilizing a power system 1000 in FIG. 19 is an apparatus in which the state variable fluctuation amount data D28 is additionally installed in the apparatus for stabilizing a power system 10 in FIG. 1.

Accordingly, as the input data of the apparatus for stabilizing a power system 10, the state variable fluctuation amount data D28 is added in addition to the system model data D221, the characteristic state variable data D22, the system stability calculation requiring/non-requiring determination threshold value data D23, the state variable data D24, the system configuration pattern data D25, the power-flow state generation condition data D26, and the to-be-controlled candidate calculation condition data D27.

In addition, the result data of the apparatus for stabilizing a power system 1000 is the same as those of the apparatus for stabilizing a power system 10 in FIG. 1.

In addition, the function of the apparatus for stabilizing a power system 1000 is the same as that of the apparatus for stabilizing a power system 10 in FIG. 1 except for the system stability calculation requiring/non-requiring determination processing unit 36. In the system stability calculation requiring/non-requiring determination processing unit 36, by using the system stability calculation requiring/non-requiring state range extraction result data D45, the state variable data D24, and the state variable fluctuation amount data D28, it is determined whether or not the stability calculation of the power system is required and the system stability calculation requiring/non-requiring determination result database D46 is output. The system stability calculation requiring/non-requiring determination result data D46 is stored in the system stability calculation requiring/non-requiring determination result database DB46.

FIG. 20 is an example of the hardware configuration of the apparatus for stabilizing a power system 1000 and the overall configuration view of the system of the power system 100 in Example 2, and is a view in which a state variable fluctuation amount database DB28 is connected to the bus line 60 and is additionally installed in the overall configuration view of the apparatus for stabilizing a power system 10 and the power system 100 in Example 1 illustrated in FIG. 2. In FIG. 20, the description of the parts having the same functions as those of the configurations to which the same reference signs illustrated in FIG. 2 described above are given will be omitted.

In the apparatus for stabilizing a power system 1000, 17 databases are roughly divided and stored. In the following, the description of the database that has been already described will be omitted, and the state variable fluctuation amount database DB28 which is newly added will be described.

In the state variable fluctuation amount database DB28, as illustrated in FIG. 21, the state variable fluctuation amount data D28 is stored as data, such as a location of the state variable (D281), a type (D282), and a fluctuation amount (D283). The fluctuation amount D283 of the state variable is, for example, the maximum fluctuation amount to be imagined within the period from the time of the system stability calculation to the time of the control command obtained in advance. Accordingly, it is possible to determine whether or not the system stability is required in accordance with the power-flow state even when the power-flow fluctuation occurs within the period from the time of the system stability calculation to the time of the control command.

Next, the calculation processing contents of the apparatus for stabilizing a power system 1000 will be described. The flowchart illustrating the overall processing of the apparatus for stabilizing a power system 1000 is the same as that in FIG. 11 and FIG. 12, but the contents of processing step S1200 in FIG. 12 are different. Therefore, processing step S1200 will be described.

In processing step S1200, by using the system stability calculation requiring/non-requiring state range extraction result data D45, the state variable data D24, and the state variable fluctuation amount data D28, it is determined whether or not the stability calculation of the power system is required and the determination result is stored in the system stability calculation requiring/non-requiring determination result database DB46.

Here, the flow of the system stability calculation requiring/non-requiring determination by processing step S1200 of FIG. 12 will be described with reference to FIG. 22. FIG. 22 is an example of a flowchart for describing the processing of the system stability calculation requiring/non-requiring determination unit 36 in FIG. 19.

In processing step S1204, it is determined whether or not the value of the characteristic state variable in the data obtained by adding the value of the corresponding state variable fluctuation amount data D28 to the value of the state variable data D24 exists in the system stability calculation requiring range. In a case where the value of the characteristic state variable exists, the process proceeds to processing step S1202. In a case where the value of the characteristic state variable does not exist, the process proceeds to processing step S1205.

In processing step S1205, the candidate object to be controlled with respect to the value obtained by adding the value of the fluctuation amount of the characteristic state variable in the state variable fluctuation amount data to the value of the characteristic state variable in the system stability calculation requiring/non-requiring state range extraction result data D45 is set in an object to be controlled.

Processing step S1202 is the same as the contents of the processing step having the same reference signs in FIG. 15.

Accordingly, in a case where it is determined that the online system stability calculation is not required in processing step S1200, it is possible to immediately determine the object to be controlled to which the system stabilization is possible even when the power flow fluctuates during the period from the time of the system stability calculation to the time of the control command.

Figure 23:
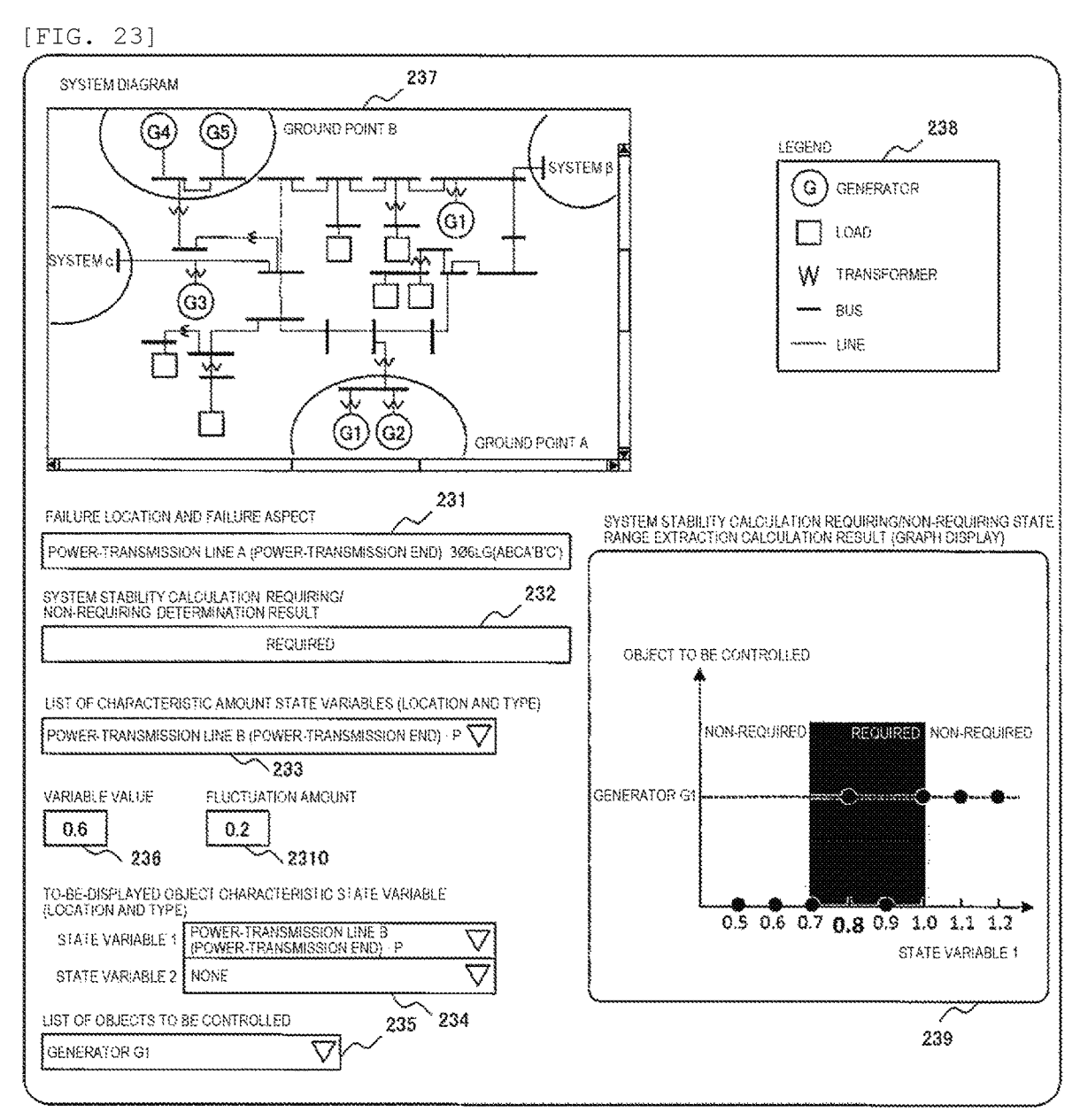

Here, an example of the specific display contents will be described with reference to FIG. 23. FIG. 23 is basically the same as the display screen (FIG. 16) of the apparatus for stabilizing a power system 10, but a state variable fluctuation amount 2310 is newly added and displayed. The system stability calculation requiring/non-requiring state range extraction result is tabular in FIG. 9, but may be displayed as a graph as illustrated in FIG. 23. In addition, a system diagram 237 and a legend 238 are also displayed in the display of FIG. 23, and thus, the display format which is easy for the user to understand is employed.

As illustrated in FIG. 23, by displaying the power system stabilization calculation result on the screen of the monitoring control device 200 via the apparatus for stabilizing a power system 1000 or the communication network 300, in the power system 100, an effect to understand which generator has been controlled at a glance is achieved.

In addition, in a case where a plurality of characteristic state variables exist, it is possible to select a characteristic state variable 164 to be displayed in the system stability calculation requiring/non-requiring state range extraction result, and to confirm the system stability calculation requiring/non-requiring state range extraction result for the selected characteristic state variable.

The apparatus for stabilizing a power system of Example 2 described above generates the imaginable failure scenario by using the system model data D21 and the system configuration pattern data D25; generates the power-flow state by using the imaginable failure scenario generation result data D41, the system model data D21, the state variable data D24, the system configuration pattern data D25, and the power-flow state generation condition data D26; calculates the stability of the power system by using the power-flow state generation result data D42, the system model data D21, and the system configuration pattern data D25; calculates the candidate object to be controlled for stabilization of the power system by using the system stability calculation result data D43 and the to-be-controlled candidate calculation condition data D27; calculates the control table by using the imaginable failure scenario generation result data D41, the power-flow state generation result data D42, and the to-be-controlled candidate calculation result data D401; extracts the state range where the stability calculation of the power system is required and the state range where the stability calculation is not required by using the control table calculation result data D44 and the system stability calculation requiring/non-requiring determination threshold value data D23; determines whether or not the stability calculation of the power system is required by using the system stability calculation requiring/non-requiring state range extraction result data D45, the state variable data D24, and the state variable fluctuation amount data D28; determines the object to be controlled by using the system stability calculation requiring/non-requiring determination result data D46; commands a control by using the to-be-controlled object determination result data D47; and displays the command result and each calculation result.

In addition, in Example 2, a power system stabilizing system in which the apparatus for stabilizing a power system 1000 is applied to the power system is configured.

According to Example 2, as described above, it is possible to improve the system stabilization performance in a case where the power flow fluctuates during the period from the time of the system stability calculation to the time of the control command.

REFERENCE SIGNS LIST

10: apparatus for stabilizing power system
11: CPU
12: memory
13: input unit
14: communication unit
15: display unit
30: power system stabilization calculation unit
31: imaginable failure scenario generation unit
32: power-flow state generation unit
33: power system stabilization calculation unit
301: to-be-controlled candidate calculation unit
34: control table calculation unit
35: system stability calculation requiring/non-requiring state range extraction unit
36: system stability calculation requiring/non-requiring determination unit
37: to-be-controlled object determination unit
38: control command unit
60: bus line
100: power system
110A, 110B: generator
120A, 120B, 120C, 120D: node (bus)
130A, 130B: transformer
140A, 140B, 140C, 140D: branch (line)
150: measurement device
200: monitoring control device
300: communication network
1000: apparatus for stabilizing a power system
D20: power system stabilization calculation input data
DB20: power system stabilization calculation input database
D21: system model data
DB21: system model database
D22: characteristic state variable data
DB22: characteristic state variable database
D23: system stability calculation requiring/non-requiring determination threshold value data
DB23: system stability calculation requiring/non-requiring determination threshold value database
D24: state variable data
DB24: state variable database
D25: system configuration pattern data
DB25: system configuration pattern database
D26: power-flow state generation condition data
DB26: power-flow state generation condition database
D27: to-be-controlled candidate calculation condition data
DB27: to-be-controlled candidate calculation condition database
D40: power system stabilization calculation result data
DB40: power system stabilization calculation result database
D41: imaginable failure scenario generation result data
DB41: imaginable failure scenario generation result database
D42: power-flow state generation result data
D42: power-flow state generation result database
D43: system stability calculation result data
DB43: system stability calculation result database
D401: to-be-controlled candidate calculation result data
DB401: to-be-controlled candidate calculation result database
D44: control table calculation result data
DB44: control table calculation result database
D45: system stability calculation requiring/non-requiring state range extraction result data
DB45: system stability calculation requiring/non-requiring state range extraction result database
D46: system stability calculation requiring/non-requiring determination result data
DB46: system stability calculation requiring/non-requiring determination result database
D47: to-be-controlled object determination result data
DB47: to-be-controlled object determination result database
D50: program data
DB50: program database
D28: state variable fluctuation amount data
DB28: state variable fluctuation amount database

The invention claimed is:

1. An apparatus for stabilizing a power system, comprising:
an imaginable failure scenario generation unit that generates an imaginable failure scenario by using system model data and system configuration pattern data;
a power-flow state generation unit that generates a power-flow state of a power system by using generation result data of the imaginable failure scenario, the system model data, state variable data, power-flow state generation condition data, and the system configuration pattern data;
a system stability calculation unit that calculates system stability of the power system by using generation result data of the power-flow state, the system model data, and the system configuration pattern data;
a to-be-controlled candidate calculation unit that calculates a candidate object to be controlled for stabilization of the power system by using calculation result data of the system stability and to-be-controlled candidate calculation condition data;
a control table calculation unit that calculates a control table by using calculation result data of the candidate object to be controlled;
a system stability calculation requiring/non-requiring state range extraction unit that extracts a state range where stability calculation of the power system is required and a state range where stability calculation is not required by using calculation result data of the control table and system stability calculation requiring/non-requiring determination threshold value data; and
a system stability calculation requiring/non-requiring determination unit that determines whether or not stability calculation of the power system is required by using extraction result data of the state range and the state variable data.

2. The apparatus for stabilizing a power system according to claim 1, further comprising:
a to-be-controlled object determination unit that determines an object to be controlled by using result data of the determination; and
a control command unit that commands a control by using determination result data of the object to be controlled.

3. The apparatus for stabilizing a power system according to claim 1,
wherein the power-flow state generation unit changes values of a generator and a load by using a maximum value, a minimum value, and a change increment of the generator and the load in the power-flow state generation condition data, and obtains the result of the power-flow calculation as a power-flow state.

4. The apparatus for stabilizing a power system according to claim 1,
wherein the system stability calculation requiring/non-requiring state range extraction unit sets a range from a value obtained by subtracting a system stability calculation requiring/non-requiring determination threshold value from a value at which the candidate object to be controlled changes when the characteristic state variable in the control table is increased, to a value obtained by adding a system stability calculation requiring/non-requiring determination threshold value to a value at which the candidate object to be controlled does not change when the characteristic state variable in the control table is increased, in a system stability calculation requiring range, and sets a range other than the range in a system stability calculation non-requiring range.

5. The apparatus for stabilizing a power system according to claim 1,
wherein the system stability calculation requiring/non-requiring determination unit determines that the system stability calculation is required in a case where a value of characteristic state variable data in state variable data is within a system stability calculation requiring range in extraction result data of the state range, and sets a candidate object to be controlled in system stability calculation requiring/non-requiring state range extraction result data with respect to a value of characteristic state variable data as an object to be controlled in a case where the value is within a system stability calculation non-requiring range.

6. The apparatus for stabilizing a power system according to claim 1,
wherein the system stability calculation requiring/non-requiring determination unit determines that the system stability calculation is required in a case where a value of characteristic state variable data in data obtained by adding corresponding state variable fluctuation amount data to a value of state variable data is within a system stability calculation requiring range in extraction result data of the state range, and sets a candidate object to be controlled in extraction result data of the state range with respect to a value of data obtained by adding corresponding state variable fluctuation amount data to a value of state variable data as an object to be controlled in a case where the value is within a system stability calculation non-requiring range.

7. A method for stabilizing a power system, comprising:
generating an imaginable failure scenario by using system model data and system configuration pattern data;
generating a power-flow state of a power system by using generation result data of the imaginable failure scenario, the system model data, state variable data, power-flow state generation condition data, and the system configuration pattern data;
calculating system stability of the power system by using generation result data of the power-flow state, the system model data, and the system configuration pattern data;
calculating a candidate object to be controlled for stabilization of the power system by using calculation result data of the system stability and to-be-controlled candidate calculation condition data;
calculating a control table by using calculation result data of the candidate object to be controlled;
extracting a state range where stability calculation of the power system is required and a state range where stability calculation is not required by using calculation result data of the control table and system stability calculation requiring/non-requiring determination threshold value data; and
determining whether or not stability calculation of the power system is required by using extraction result data of the state range and the state variable data.

8. The method for stabilizing a power system according to claim 7, further comprising:
determining an object to be controlled by using result data of the determination; and
commanding a control by using determination result data of the object to be controlled.

9. The method for stabilizing a power system according to claim 7,
wherein the values of a generator and a load are changed by using a maximum value, a minimum value, and a change increment of the generator and the load in power-flow state generation condition data, and the result of the power-flow calculation is obtained as a power-flow state.

10. The method for stabilizing a power system according to claim 7,
wherein a range from a value obtained by subtracting a system stability calculation requiring/non-requiring determination threshold value from a value at which the candidate object to be controlled changes when the characteristic state variable in the control table is increased, to a value obtained by adding a system stability calculation requiring/non-requiring determination threshold value to a value at which the candidate object to be controlled does not change when the characteristic state variable in the control table is increased, is set in a system stability calculation requiring range, and a range other than the range is set in a system stability calculation non-requiring range.

11. The method for stabilizing a power system according to claim 7,
wherein it is determined that the system stability calculation is required in a case where a value of characteristic state variable data in state variable data is within a system stability calculation requiring range in system stability calculation requiring/non-requiring state range extraction result data, and a candidate object to be controlled in the system stability calculation requiring/non-requiring state range extraction result data with respect to a value of characteristic state variable data is set as an object to be controlled in a case where the value is within a system stability calculation non-requiring range.

12. The method for stabilizing a power system according to claim 7,
wherein it is determined that the system stability calculation is required in a case where a value of characteristic state variable data in data obtained by adding corresponding state variable fluctuation amount data to a value of state variable data is within a system stability calculation requiring range in extraction result data of the state range, and a candidate object to be controlled in extraction result data of the state range with respect to a value of data obtained by adding corresponding state variable fluctuation amount data to a value of state variable data is set as an object to be controlled in a case where the value is within a system stability calculation non-requiring range.

* * * * *